(12) United States Patent
Martin et al.

(10) Patent No.: US 11,449,072 B2
(45) Date of Patent: Sep. 20, 2022

(54) INTELLIGENT AND ADAPTIVE TRAFFIC CONTROL SYSTEM

(71) Applicant: QUALCOMM Incorporated, San Diego, CA (US)

(72) Inventors: Paul Daniel Martin, Devon, PA (US); Jonathan Paul Davis, Philadelphia, PA (US); Michael Joshua Shomin, Philadelphia, PA (US); Stephen Marc Chaves, Philadelphia, PA (US); Daniel Warren Mellinger, III, Philadelphia, PA (US); John Anthony Dougherty, Philadelphia, PA (US); Aleksandr Kushleyev, Philadelphia, PA (US); Travis Van Schoyck, Princeton, NJ (US); Ross Eric Kessler, Philadelphia, PA (US); Moussa Ben Coulibaly, Brookhaven, PA (US); Kristen Wagner Cerase, Newark, DE (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 16/535,430

(22) Filed: Aug. 8, 2019

(65) Prior Publication Data

US 2020/0201353 A1 Jun. 25, 2020

Related U.S. Application Data

(60) Provisional application No. 62/783,417, filed on Dec. 21, 2018.

(51) Int. Cl.
*G05D 1/02* (2020.01)
*H04W 4/40* (2018.01)
(Continued)

(52) U.S. Cl.
CPC ....... *G05D 1/0276* (2013.01); *G01C 21/3415* (2013.01); *G01C 21/3492* (2013.01);
(Continued)

(58) Field of Classification Search
CPC .. G05D 1/0276; G05D 1/0212; G05D 1/0287; G05D 2201/0213; H04W 4/40;
(Continued)

(56) References Cited

U.S. PATENT DOCUMENTS 6,111,539 A 8/2000 Mannings et al.
8,121,780 B2 2/2012 Gerdes et al.
(Continued)

FOREIGN PATENT DOCUMENTS

CN 101278325 A 10/2008
CN 102445208 A 5/2012
(Continued)

OTHER PUBLICATIONS

Klugl F., et al., "A Review on Agent-based Technology for Traffic and Transportation," Article in The Knowledge Engineering Review, Jun. 2013, pp. 1-29.
(Continued)

*Primary Examiner* — Rodney A Butler
(74) *Attorney, Agent, or Firm* — Michael F. Taveira

(57) ABSTRACT

Various embodiments include methods and interactive traffic control devices for interactively controlling traffic, which may include receiving refined location and state information associated with individual vehicles on a roadway, and determining customized dynamic traffic control instructions for a first one or more of the individual vehicles. The determined customized dynamic traffic control instructions may be based on the received refined location and state information and offer an optional route alternative to a set limited number of the individual vehicles. The first customized (Continued)

dynamic traffic control instructions may be transmitted by the interactive traffic control device to the first one or more of the individual vehicles.

28 Claims, 20 Drawing Sheets

(51) Int. Cl.
    *G01C 21/34*     (2006.01)
    *G01C 21/36*     (2006.01)
    *G08G 1/09*     (2006.01)
    *G08G 1/01*     (2006.01)
    *G08G 1/0968*     (2006.01)
    *H04W 4/46*     (2018.01)
    *H04W 4/44*     (2018.01)

(52) U.S. Cl.
    CPC ..... *G01C 21/3605* (2013.01); *G01C 21/3641* (2013.01); *G01C 21/3697* (2013.01); *G05D 1/0212* (2013.01); *G05D 1/0287* (2013.01); *G08G 1/0145* (2013.01); *G08G 1/093* (2013.01); *G08G 1/096811* (2013.01); *G08G 1/096844* (2013.01); *G08G 1/096861* (2013.01); *H04W 4/40* (2018.02); *G05D 2201/0213* (2013.01); *H04W 4/44* (2018.02); *H04W 4/46* (2018.02)

(58) Field of Classification Search
    CPC ........... H04W 4/46; H04W 4/44; H04W 4/08; H04W 4/024; H04W 4/025; G01C 21/3415; G01C 21/3492; G01C 21/3605; G01C 21/3641; G01C 21/3697; G08G 1/0145; G08G 1/093; G08G 1/096811; G08G 1/096844; G08G 1/096861; G08G 1/0116; G08G 1/0112
    See application file for complete search history.

(56) References Cited

U.S. PATENT DOCUMENTS

| | | |
|---|---|---|
| 9,755,850 B2 | 9/2017 | Stolfus et al. |
| 2011/0087429 A1 | 4/2011 | Trum |
| 2015/0254986 A1 | 9/2015 | Fairfield et al. |
| 2017/0184409 A1 | 6/2017 | Glasgow et al. |
| 2018/0174449 A1 | 6/2018 | Nguyen et al. |
| 2018/0204458 A1 | 7/2018 | Fairfield et al. |
| 2018/0244275 A1 | 8/2018 | Bremkens et al. |
| 2018/0309592 A1 | 10/2018 | Stolfus |
| 2018/0374346 A1 | 12/2018 | Fowe |
| 2019/0051171 A1* | 2/2019 | Malkes ................ H04W 4/024 |
| 2019/0096238 A1* | 3/2019 | Ran ..................... G08G 1/0968 |
| 2019/0120654 A1 | 4/2019 | Todasco et al. |
| 2020/0200563 A1 | 6/2020 | Martin et al. |
| 2020/0202711 A1 | 6/2020 | Martin et al. |
| 2020/0365015 A1* | 11/2020 | Nguyen ............... G08G 1/0133 |

FOREIGN PATENT DOCUMENTS

| | | |
|---|---|---|
| CN | 102576491 A | 7/2012 |
| CN | 106458218 A | 2/2017 |
| CN | 107872775 A | 4/2018 |
| CN | 108447291 A | 8/2018 |
| CN | 108474662 A | 8/2018 |
| CN | 108877250 A | 11/2018 |
| CN | 109003441 A | 12/2018 |
| EP | 1085345 A1 | 3/2001 |

OTHER PUBLICATIONS

McKenney C., "Distributed and Adaptive Traffic Signal Control within a Realistic Traffic Simulation," Sep. 2011, 160 pages.
International Search Report and Written Opinion—PCT/US2019/058406—ISA/EPO—dated Feb. 26, 2020 14 pages.

* cited by examiner

First Vehicle Display

Second Vehicle Display

First Vehicle Display

Second Vehicle Display

First Vehicle Display

Second Vehicle Display

INTELLIGENT AND ADAPTIVE TRAFFIC CONTROL SYSTEM

RELATED APPLICATIONS

This application claims the benefit of priority to U.S. Provisional Application No. 62/783,417, entitled "Intelligent and Adaptive Traffic Control System" filed Dec. 21, 2018, the entire contents of which are hereby incorporated by reference for all purposes.

BACKGROUND

Traffic signs are typically static signs (e.g., stop signs), timed signals (e.g., traffic lights that cycle through hard-coded lighting sequences), and reactive signals (e.g., traffic lights that react to detected vehicles using sensors, such as magnetic strips integrated into pavement). In many cases, contemporary signs and signals result in sub-optimal traffic patterns, which may force vehicles to unnecessarily slow down or stop (e.g., for traffic signs/lights) when there is no cross-traffic or inadvertently travel through areas with high traffic or congestion.

Vehicle communication systems and standards are under development to support intelligent highways, autonomous and semi-autonomous vehicles, and improve the overall efficiency and safety of highway transportation systems. Some vehicles include vehicle-to-infrastructure (V2X) and/or vehicle-to-vehicle (i.e., V2V)) communication systems and functionality that provide the ability for a vehicle to broadcast vehicle information that the highway transportation system and other vehicles can receive and process to improve traffic conditions.

SUMMARY

Various aspects include methods, as well as systems and devices configured to execute such methods for interactively controlling traffic. Various aspects may include receiving, for example by an interactive traffic control device, refined location and state information associated with individual vehicles on a roadway, and determining first customized dynamic traffic control instructions for a first one or more of the individual vehicles. The first customized dynamic traffic control instructions may be based on the received refined location and state information and offer an optional route alternative to a set limited number of the individual vehicles. Various aspects further include transmitting the first customized dynamic traffic control instructions by the interactive traffic control device to the first one or more of the individual vehicles.

In some aspects, only a subset of the set limited number of the individual vehicles may be granted authorization to use the optional route alternative based on an order in which vehicles respond to the first customized dynamic traffic control instructions. The first customized dynamic traffic control instructions may be configured such that the instructions include a set expiration period. In this way, only vehicles that accept the optional route alternative within the set expiration period are authorized to use the optional route alternative. In some aspects, only a subset of the set limited number of the individual vehicles may be granted authorization to use the optional route alternative based on each of the vehicles that respond to the first customized dynamic traffic control instruction meeting multiple criteria.

In some aspects, the interactive traffic control device may receive an acceptance of the optional route alternative, determine whether a vehicle transmitting the acceptance of the optional route alternative should be authorized to follow the optional route alternative based on conditions determined in response to receiving the acceptance of the optional route alternative, transmit a denial of the acceptance in response to determining that the vehicle transmitting the acceptance of the offered optional route alternative should not be authorized to follow the optional route alternative, and transmit a different route alternative in response to determining that the vehicle transmitting the acceptance of the offered optional route alternative should not be authorized to follow the optional route alternative.

In some aspects, the interactive traffic control device may determine second customized dynamic traffic control instructions for a second one or more of the individual vehicles different from the first one or more of the individual vehicles. The first customized dynamic traffic control instructions may include navigational information different from navigation information included in the second customized dynamic traffic control instructions, the second customized dynamic traffic control instructions may be transmitted by the interactive traffic control device to the second one or more of the individual vehicles. In some aspects, the optional route alternative may not be included in the second customized dynamic traffic control instructions. In some aspects, transmitting the first customized dynamic traffic control instructions may use a wireless communication link between the interactive traffic control device and a mobile communication device within at least one of the first one or more of the individual vehicles. In some aspects, transmitting the first customized dynamic traffic control instructions may use a wireless communication link between the interactive traffic control device and an onboard computing device of at least one of the first one or more of the individual vehicles. In some aspects, at least one of the first one or more of the individual vehicles may be an autonomous vehicle.

Further aspects include an interactive traffic control device including a processor configured with processor-executable instructions to perform operations of any of the methods summarized above. Further aspects include a non-transitory processor-readable storage medium having stored thereon processor-executable software instructions configured to cause a processor of an interactive traffic control device to perform operations of any of the methods summarized above. Further aspects include a processing device for use in an interactive traffic control device and configured to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1:
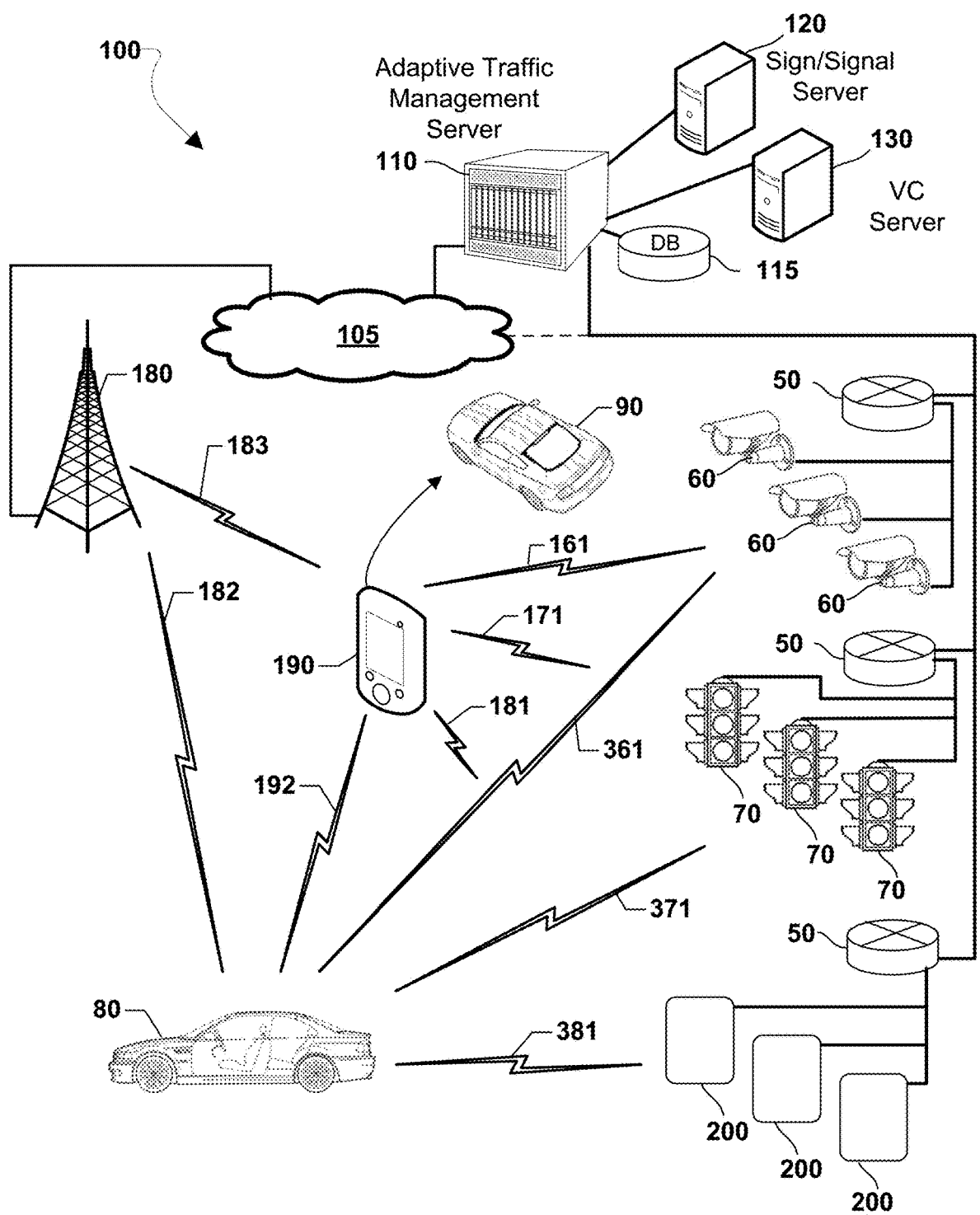
FIG. 1 is a schematic system diagram illustrating components of an adaptive traffic management system suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems that enable a vehicle to report various types of information about the vehicle to an adaptive traffic management system. In particular, a vehicle may report refined location and state information of the vehicle to an adaptive traffic management system via a network. Such refined location and state information may include much more than just the vehicle position, speed, and direction of travel. For example, the refined location and state information may include precise details about vehicle movement and orientation, as well as destination, fuel/power level(s), emergency status, restriction, capabilities, equipment problems, owner/operator travel preferences, and/or owner/operator identification information. In turn, the adaptive traffic management system may collect and analyze the autonomous vehicle information, along with similar information from numerous other vehicles, as part of traffic planning and management. The adaptive traffic management system may then communicate to the autonomous vehicle and the other vehicles, such as by using interactive traffic control device, and those vehicles may use such instructions (e.g., following adaptive traffic signs) for navigation. Thus, various embodiments may enable improved traffic flow management, reduce vehicle waiting times, reduce emergency response times, and reduce traffic delays, which also reduces pollution.

Some contemporary highway systems include traffic lights and other signage that change their display or cycles based on time of day, congestion, or at preset cycles. Using information collected from roadway sensors, traffic control systems may attempt to implement limited congestion control measures. For example, lane open/closed signs or dynamic road geometry elements (i.e., moveable highway barriers) may be activated to limit or expand the number of lanes available on a highway in a particular direction. Such conventional systems fail to consider information beyond vehicle position, speed, and/or direction of travel. In addition, other than physically controlling access to roadways or lanes in roadways, conventional systems do not reward vehicle owners for cooperating with the management of vehicular traffic.

Various embodiments support traffic flow management by leveraging the sensor and processing capabilities of modern motor vehicles (e.g., autonomous and semi-autonomous vehicles), available high-speed communications (e.g., 5G cellular networks), and the quick decision-making ability of computerized systems that may be maintained by a traffic authority. Modern vehicles may be equipped with vehicle systems, such as sensor systems (e.g., cameras, radar, lidar, GPS receivers, etc.) and autonomous/semi-autonomous navigation and control system that determine and refine their location (e.g., to support vehicle navigation) and state (e.g., to support safety systems). Autonomous vehicles may also be equipped with vehicle-to-everything communications systems, such as V2X and/or V2V, that may be used to communicate their refined location and state information. Thus, V2X communications may allow vehicles to communicate refined location and state information to an adaptive traffic management system. Informed by refined location and state information received from numerous vehicles, and using information gathered by fixed and/or moveable roadway sensors and other adaptive traffic management infrastructure, the adaptive traffic management system may take actions to manage traffic flow and improve safety. Additionally, the V2X communications may allow the adaptive traffic management system to send information (e.g., instructions, advisories, updates) to vehicles. V2V communications may also allow autonomous vehicles that are near or approaching one another to avoid collisions or other hazards, as well as share information intended for distribution by the adaptive traffic management system.

Various embodiments include adaptive traffic management systems equipped with interactive traffic control devices that may be scheduled so that (i) vehicles do not needlessly stop when there is no cross-traffic, (ii) vehicles are dynamically re-routed to lighter traffic areas, (iii) and traffic is spread out over large areas to improve throughput on a large scale. Such interactive traffic control device may predict when vehicles will arrive and can also use information about a vehicle's destination, potentially ensuring that a protected turn is available when the vehicle arrives. The adaptive traffic management systems may use such interactive traffic control devices to purposefully create groupings of vehicles traveling in dense formations that may allow cross-traffic to be interwoven, between separate batches of vehicles, at traffic intersections. Although traffic is often a zero-sum-game in that favoring one vehicle may impede another, there are circumstances in which impeding one or more vehicles in favor of one or more other vehicles may benefit the system overall. For example, grouping sets of vehicles may create gaps between those groups that provide openings for cross-traffic to pass.

In various embodiments, adaptive traffic management systems may use interactive traffic control device for controlling or influencing vehicular traffic. In the case of autonomous or semi-autonomous vehicles, an adaptive traffic management system may exert direct control using interactive traffic control device that transmit traffic commands to those vehicles. Alternatively, autonomous or semi-autonomous vehicles may react and/or respond to the instructions from the interactive traffic control device as programmed by a vehicle owner or operator. In the case of non-autonomous vehicles or semi-autonomous vehicles not configured to automatically respond to the adaptive traffic management system, the communications with the vehicle operator may be through interactive traffic control device located alongside or near a roadway or pushed to an onboard display within the vehicles. The interactive traffic control device may be configured to encourage driver cooperation through incentives, which may be financial and/or in the form of a credit for future favorable traffic management treatment.

As used herein, the terms "component," "system," "unit," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Various embodiments may be implemented within a variety of adaptive traffic management systems configured to provide customized dynamic traffic control instructions to individual vehicles. An example adaptive traffic management system 100 is illustrated in FIG. 1. With reference to FIG. 1, the adaptive traffic management system 100 may include an adaptive traffic management server 110 configured to determine and generate dynamic traffic control instructions for individual vehicles traveling on roadways managed by the adaptive traffic management server 110. In addition or alternatively, the adaptive traffic management system 100 may include one or more interactive traffic control devices 200 configured to determine and generate dynamic traffic control instructions for individual vehicles traveling on an adjacent roadway or intersection.

The adaptive traffic management server 110 may be configured to communicate with one or more autonomous vehicles and/or wireless communication devices 190 (e.g., carried on-board or installed in a non-autonomous or semi-autonomous vehicle 90; hereinafter referred to as a "non/semi-autonomous vehicle"). The wireless communication device 190 may be a mobile computing device configured to be easily removed from the non/semi-autonomous vehicle 90 (e.g., cell phone) or may by an installed electronic component of the non/semi-autonomous vehicle 90. The autonomous vehicle 80 and/or the wireless communication device 190 may transmit refined location and state information, related to the respective vehicle, to the adaptive traffic management server 110. In response to receiving the refined location and state information, the adaptive traffic management server 110 may transmit dynamic traffic control instructions to the autonomous vehicle 80 and/or the wireless communication device 190.

The interactive traffic control devices 200 may be configured to more directly communicate with autonomous vehicles 80 and/or wireless communication devices 190. In this way, the autonomous vehicle 80 and/or the wireless communication device 190 may transmit refined location and state information directly to one or more of the interactive traffic control devices 200. In addition, the interactive traffic control devices 200 may receive refined location and state information, traffic data, or dynamic traffic control information from various elements of the traffic management infrastructure (e.g., the adaptive traffic management server 110, roadway sensors 60, conventional traffic signaling devices 70, and other interactive traffic control devices 200). Additionally, the interactive traffic control devices 200 may determine, or partially determine, and transmit dynamic traffic control instructions to the autonomous vehicles 80 and/or the wireless communication devices 190.

The refined location and state information may include detailed information associated with the autonomous vehicle and the vehicle owner and/or operator, such as the vehicle specifications (e.g., size, weight, color, etc.), position, speed, acceleration, direction of travel, attitude, orientation, destination, fuel/power level(s), emergency status (e.g., whether the autonomous vehicle is an emergency vehicle or private individual in an emergency), restrictions (e.g., heavy/wide load, turning restrictions, high occupancy vehicle (HOV) authorization, etc.), capabilities, (e.g., all-wheel drive, four-wheel drive, snow tires, chains) of the autonomous vehicle, equipment problems (e.g., low tire pressure, weak breaks, etc.), owner/operator travel preferences (e.g., preferred lane, roads, routes, and/or destinations, preference to avoid tolls or highways, preference for the fastest route, etc.), and/or owner/operator identification information.

The adaptive traffic management server 110 may include one or more computing systems configured to provide live adaptive traffic planning and management for one or more roadways, intersections, cites, or regions. For example, the adaptive traffic management server 110 may include one or more separate databases 115, a sign/signal management server 120, and/or a vehicle control (VC) server 130, firewalls, and other network infrastructure. The databases 115 may maintain information about roadways, intersections, traffic management infrastructure elements, and other elements of the traffic management network. The sign/signal management server 120 may provide processing and control of interactive traffic control device and other signaling elements of the traffic management infrastructure. The vehicle control server 130 may provide processing and management of autonomous and semi-autonomous vehicle signaling. The adaptive traffic management server 110 may be connected, via wired or wireless connections, to various elements of traffic management infrastructure through the network 105 using a virtual private network configuration and/or through a direct connection in a dedicated private network. The traffic management infrastructure managed by the adaptive traffic management server 110 may include roadway sensors 60, conventional traffic signaling devices 70, and interactive traffic control devices 200 connected to the adaptive traffic management server 110 via one or more routers 50. In addition, the adaptive traffic management server 110 may be connected, via wired and wireless connections, to non/semi-autonomous vehicles 90 with a wireless communication device 190 onboard, using a wireless communication link 183, and/or autonomous vehicles 80 (i.e., autonomous or semi-autonomous vehicles), using the wireless communication link 182 (i.e., signals). Further, the adaptive traffic management server 110 may be connected, via wired and wireless connections, to additional traffic management infrastructure, such as moveable highway barriers, traffic cones, mechanically changeable direction signs, etc.

The roadway sensors 60 may include cameras, motion sensors, magnetic or pressure activated proximity sensors, and other traffic measurement and detection devices, which may be distributed on or near the roadways being managed. The roadway sensors 60 may be used to observe and/or detect traffic speeds, volume, location, identification tags/markings, and other information related to traffic management. In addition, using a wireless communication link 161, the roadway sensors 60 may be configured to receive refined location and state information from non/semi-autonomous vehicles 90 with a wireless communication device 190 onboard, using a wireless communication link 161, and/or autonomous vehicles 80, using a wireless communication link 361, operating on or near the managed roadways. In this way, the roadway sensors 60 may not only provide the adaptive traffic management server 110 information about areas of congestion, but also provide information about where vehicles are going so the system may anticipate congestion and transmit traffic instructions for potentially avoiding such congestion.

The conventional traffic signaling devices 70 may include stop lights and other signaling devices, such as turn, pedestrian, and cyclist signals. The state and timing of the conventional traffic signaling devices 70 may be altered and controlled by the adaptive traffic management server, if needed. The autonomous vehicles 80 and/or other vehicles 90 may respond/react to the conventional traffic signaling devices 70 in the usual way. Also, the conventional traffic signaling devices 70 may be augmented and equipped with a transceiver for receiving refined location and state information from the non/semi-autonomous vehicles 90 with a wireless communication device 190 onboard, using a wireless communication link 171, and/or from the autonomous vehicles 80, using a wireless communication link 371.

The interactive traffic control device 200 may include many of the same features and functions as the roadway sensors 60 and the conventional traffic signaling devices 70. Thus, the interactive traffic control device 200 may be configured to receive refined location and state information from the non/semi-autonomous vehicles 90 with a wireless communication device 190 onboard, using a wireless communication link 181, and/or from the autonomous vehicles 80, using a wireless communication link 381.

Additionally or alternatively, the interactive traffic control device 200 may be configured to perform many of the same features and/or functions described above with regard to the adaptive traffic management server 110. In particular, the interactive traffic control device 200 may be configured to receive refined location and state information associated with individual vehicles on a roadway. In addition, the interactive traffic control device 200 may include one or more computing systems configured to determine, generate, and transmit dynamic traffic control instructions to vehicles on an adjacent roadway and/or intersection. For example, the interactive traffic control device 200 may maintain information about the adjacent roadway and/or intersection. The interactive traffic control device 200 may be connected, via wired or wireless connections, to various elements of traffic management infrastructure (e.g., the adaptive traffic management server 110, roadway sensors 60, and conventional traffic signaling devices 70). In addition, the interactive traffic control device 200 may communicate with non/semi-autonomous vehicles 90 (e.g., via a wireless communication device 190 onboard) using the wireless communication link 181, and/or autonomous vehicles 80 (i.e., autonomous or semi-autonomous vehicles) using the wireless communication link 381.

In accordance with various embodiments, the adaptive traffic management server 110 may determine customized dynamic traffic control instructions for individual vehicles traveling on roadways controlled by the adaptive traffic management system 100. Additionally or alternatively, the interactive traffic control device 200 may determine customized dynamic traffic control instructions for individual vehicles traveling on roadways or an intersection adjacent the interactive traffic control device 200. The customized dynamic traffic control instructions may be particularly tailored to individual vehicles, taking into account current road conditions, as well as refined location and state information specific to those individual vehicles. In this way, dynamic traffic control instructions may be customized for each vehicle or for groups of vehicles. Said another way, first customized dynamic traffic control instructions may be determined for a first one or more of the individual vehicles and second customized dynamic traffic control instructions may be determined for a second one or more of the individual vehicles different from the first one or more of the individual vehicles. The first customized dynamic traffic control instructions may include navigational information that differs from the second customized dynamic traffic control instructions. Once determined, either by the adaptive traffic management server 110 or the interactive traffic control device 200, the first customized dynamic traffic control instructions may be transmitted to the individual vehicles by one or more of the interactive traffic control devices 200 in close-proximity to each vehicle.

The interactive traffic control device 200 may present a display that mimics conventional traffic signaling devices (e.g., 70). In addition, the interactive traffic control device 200 may communicate (i.e., transmit) customized dynamic traffic control instructions to autonomous vehicles 80 or wireless communication devices 190, such as those in non/semi-autonomous vehicles 90. The interactive traffic control device 200 may update the adaptive traffic management server 110 with state information indicating what customized dynamic traffic control instructions are currently being displayed or otherwise communicated by the interactive traffic control device 200. Optionally, the interactive traffic control device 200 may provide the adaptive traffic management server 110 with a historic and a currently-planned future state schedule.

To communicate instructions, the interactive traffic control device 200 may be configured to generate a display on a physical roadside sign that visually conveys information to vehicles and their operators, as well as pedestrians or others able to observe the display. Alternatively, or additionally, the interactive traffic control device 200 may act like a beacon that communicates instructions to the autonomous vehicles 80 for generating a display therein or to the wireless communication devices 190 for generating a display thereon (i.e., in-vehicle messaging). As a further alternative, in various embodiments the interactive traffic control device 200 may act like a beacon that communicates non-visual instructions to the autonomous vehicles 80, such as in the form of commands that the autonomous or semi-autonomous vehicles are supposed to follow or act upon according to programmed rules sets.

In-vehicle messaging may be communicated to the vehicle operator through a display or audio message generated by either onboard electronics (e.g., dashboard navigation/backup-camera display) or through mobile communication device (e.g., cell phone). In-vehicle messaging may be on a display, using images, symbols, and/or text, or through audible instructions. For example, customized dynamic traffic control instructions may instruct a vehicle to stay with a group (i.e., batching) by displaying a representation of the group that shows the operator's own vehicle relative to the other group vehicles. Alternatively, a text or audible message may provide guidance, such as by instructing the operator to follow a particular car (e.g., the car immediately ahead). In-vehicle messaging may enable two different vehicles traveling alongside one another to simultaneously receive (and display) the same or different messages. Instructions may depend upon circumstances, which may call for groups of vehicles to receive the same instructions and/or one or more individual vehicles to receive different instructions. For example, one vehicle may receive instructions indicating that the speed limit is 65 mph, while another vehicle may receive instructions indicating that the speed is limited to 55 mph. Similarly, one vehicle may receive one or more instructions that are the equivalent to a stop sign, while another vehicle may receive one or more instructions that are the equivalent to a yield sign or no sign at all (e.g., a blank display).

The interactive traffic control device 200 may communicate instructions otherwise normally seen on traditionally static traffic control signs that use words, symbols, or a combination. For example, traditionally static traffic control signs often include regulatory signs (e.g., "STOP," "YIELD," "DO NOT ENTER," "NO LEFT TURN," "NO RIGHT TURN," "NO U TURN," etc.), warning signs (e.g., "Merging Traffic," "Pedestrian Crossing," "Deer Crossing," "Advisory Speed," or "NO PASSING") and temporary traffic control signs (e.g., "Detour," "Workers Ahead," "Shoulder Closed Ahead," "Slow Traffic Ahead," etc.). Thus, the interactive traffic control device 200 may communicate dynamic traffic control instructions that are the same or similar to the type of information normally displayed on traditionally static traffic control signs, but may also turn off or change the communicated instructions as a traffic management tool, when it is safe to do so, such as when it will not cause danger to other vehicles or pedestrians. In addition, the interactive traffic control device 200 may communicate customized textual or graphic instructions (e.g., "Stay in your lane" or "Make the next left") to give guidance to one or more specific vehicles. The interactive traffic control device 200 may change to communicate different information at different times, and also may communicate different information to different vehicles, even simultaneously or close in-time.

Figure 2:
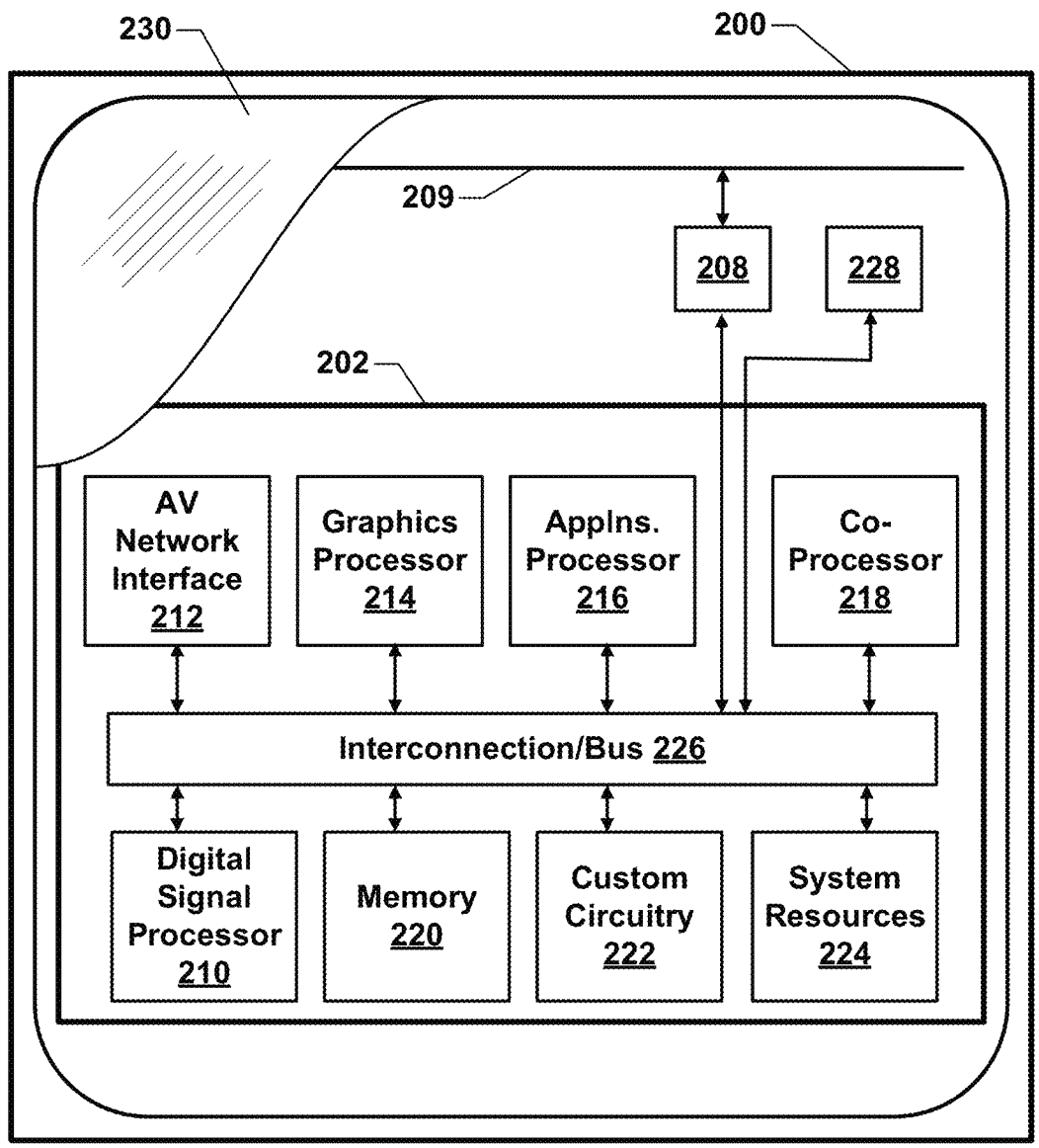
FIG. 2 is a schematic block diagram of an example intelligent and adaptive traffic sign suitable for implementing various embodiments.

FIG. 2 is a schematic block diagram of an example interactive traffic control device 200 suitable for implementing various embodiments. With reference to FIGS. 1-2, the interactive traffic control device 200 may be used to implement operations of various embodiments.

The interactive traffic control device 200 illustrated in FIG. 2 may include a device control unit 202. The control unit may include, for example, a digital signal processor (DSP) 210, an autonomous vehicle (AV) network interface 212, a graphics processor 214, an application processor 216, one or more coprocessors 218 (e.g., vector co-processor) connected to one or more of the processors, memory 220, custom circuitry 222, and system resources 224, all interacting via an interconnection/bus module 226. The graphics processor 214 may also be coupled to a display 230, which may be configured to generate messages, such as customized dynamic traffic control instructions.

Each processor 210, 214, 216, 218 may include one or more cores, and each processor/core may perform operations independent of the other processors/cores. One or more of the processors may be configured with processor-executable instructions to perform operations of methods of various embodiments (e.g., methods 1500, 1600, 1700, 1800, 1900, 2000, 2300, and 2500 described herein with reference to FIGS. 16-20, respectively). The processors 210, 214, 216, 218 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into one or more of the processors 210, 214, 216, 218. The processors 210, 214, 216, 218 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 210, 214, 216, 218 including internal memory or removable memory plugged into the device and memory within the processors 210, 214, 216, 218.

The interactive traffic control device 200 may include one or more components for enabling one-way or two-way wireless communications, particularly with vehicles. For example, the interactive traffic control device 200 may have one or more radio signal transceivers 208 (e.g., Bluetooth®, Zigbee®, Wi-Fi, HF, VHF, RF radio, etc.) and antennae 209, for sending and receiving wireless transmissions, coupled to each other and/or to one or more of the processors 210, 214, 216, 218. The radio signal transceivers 208 and antennae 209 may be used with the above-mentioned circuitry to implement the various wireless transmission protocol stacks and interfaces. The interactive traffic control device 200 may also include a cellular network component(s) 228, which may include a wireless modem chip and/or other elements for enabling communication via a cellular network, such as 5G, LTE, 4G, 3G, and/or (Global System for Mobile communication (GSM) protocol networks. The cellular network component(s) 228 may also be coupled to one or more of the processors 210, 214, 216, 218.

The interactive traffic control device 200 may also include one or more speakers for outputting audio, such as an alarm or to communicate instructions to people in close proximity thereto. The interactive traffic control device 200 may include a power source coupled to the processors 210, 214, 216, 218. In addition, the interactive traffic control device 200 may include additional sensors, such as a motion sensor and/or one or more image sensors coupled to one or more of the processors 210, 214, 216, 218 for providing sensor input.

Various embodiments use refined location and state information specific to individual vehicles. The refined location and state information may be used to determine dynamic traffic control instructions that may be transmitted to individual vehicles to provide interactive traffic controls.

Figure 3:
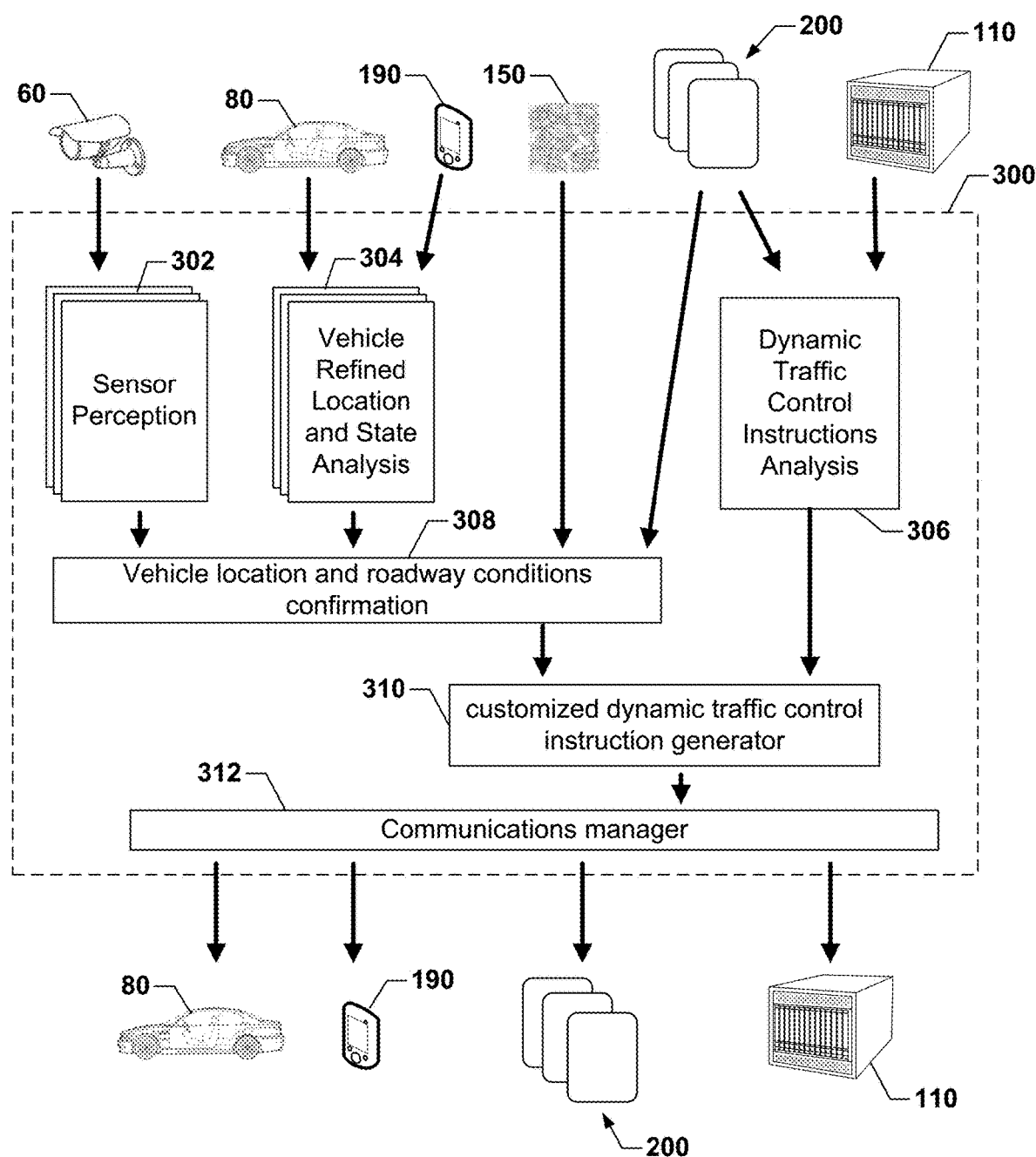
FIG. 3 is a schematic block diagram illustrating components of an example dynamic traffic control system according to various embodiments.

FIG. 3 illustrates an example of subsystems, computational elements, computing devices or units of a dynamic traffic control system 300, which may be utilized within an interactive traffic control device (e.g., 200). With reference to FIGS. 1-3, in some embodiments, the various computational elements, computing devices or units within the dynamic traffic control system 300 may be implemented within a system of interconnected computing devices (i.e., subsystems), that communicate data and commands to each other (e.g., indicated by arrows in FIG. 3). In other embodiments, the various computational elements, computing devices or units within dynamic traffic control system 300 may be implemented within a single computing device, such as separate threads, processes, algorithms or computational elements. Therefore, each subsystem/computational element illustrated in FIG. 3 is also generally referred to herein as a "layer" within a computational "stack" that constitutes the dynamic traffic control system 300. However, the use of the tell is layer and stack in describing various embodiments are not intended to imply or require that the corresponding functionality is implemented within a single control system computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

In various embodiments, the dynamic traffic control system 300 may include a sensor perception layer 302, a vehicle refined location and state analysis layer 304, and a dynamic traffic control instructions analysis layer 306. may use data from roadway sensors 60 and other adaptive traffic management infrastructure. More generally, the dynamic traffic control system 300 may include a vehicle location and roadway conditions confirmation layer 308, a customized dynamic traffic control instruction generator layer 310, and a communications manager layer 312. The layers 302-312 are merely examples of some layers of the dynamic traffic control system 300 in accordance with various embodiments, however other layers may be included, such as additional layers for other, further or more specific data analysis. In addition, certain of the layers 302-312 may be excluded from the dynamic traffic control system 300. Each of the layers 302-312 may exchange data, computational results and commands as illustrated by arrows in FIG. 3. Further, the dynamic traffic control system 300 may receive and process data from navigation systems (e.g., GPS receivers, IMUs, etc.), vehicle networks (e.g., Controller Area Network (CAN) bus), and databases in memory (e.g., digital map data). The dynamic traffic control system 300 may output customized dynamic traffic control instructions to the autonomous vehicle(s) 80, wireless communication device (s) 190. the adaptive traffic management server 110, and other interactive traffic control devices 200.

The sensor perception layer 302 may receive data from roadway sensors 60 and other adaptive traffic management infrastructure and process the data to recognize and determine locations of vehicles and objects within a portion of a roadway or intersection adjacent the particular interactive traffic control device of the dynamic traffic control system 300. The sensor perception layer 302 may include use of neural network processing and artificial intelligence methods to recognize objects and vehicles, and pass such information on to the vehicle location and roadway conditions confirmation layer 308.

The vehicle refined location and state analysis layer 304 may receive data from autonomous vehicles 80 or wireless communication devices 190, such as those in non/semi-autonomous vehicles (e.g., 90) and process the data to recognize and determine locations of vehicles and objects within a vicinity of the interactive traffic control device.

The dynamic traffic control instructions analysis layer 306 may receive data from the adaptive traffic management server 110 and/or other interactive traffic control devices 200, including dynamic traffic control instructions intended for individual vehicles. The dynamic traffic control instructions analysis layer 306 may process the data to determine whether the dynamic traffic control instruction or data from the other interactive traffic control devices 200 conform to local parameters. The local parameters may include rules, constraints, and/or other considerations unique to the roadway or intersection adjacent to the interactive traffic control device executing the dynamic traffic control system 300. In addition, the local parameters may include aspects or limitations on how the particular interactive traffic control device (e.g., 200) may transmit (i.e., communicate) instructions to vehicles. For example, a display of the interactive traffic control device may be limited to simple text messaging or have size constraints or communications from the interactive traffic control device may be limited to certain bandwidths or protocols.

The vehicle location and roadway conditions confirmation layer 308 may utilize data from the sensor perception layer 302, vehicle refined location and state analysis layer 304, a high definition (HD) map database 150, and other interactive traffic control devices 200. The vehicle location and roadway conditions confirmation layer 308 may access data within the HD map database 150, as well as any output received from the sensor perception layer 302, vehicle refined location and state analysis layer 304, and other interactive traffic control devices 200 and process the data to further determine the position of a "subject vehicle" (i.e., the autonomous vehicle 80 or vehicle associated with the wireless communication device 190 providing the refined location and state information) within the map. In this way, a more precise relative vehicle position may be determined, such as a location of the vehicle within a lane of traffic, a position of the vehicle within a street map, etc. The HD map database 150 may be stored in a memory (e.g., memory 466). For example, the vehicle location and roadway conditions confirmation layer 308 may convert location information from the sensor perception layer 302, the vehicle refined location and state analysis layer 304, and the other interactive traffic control devices 200 into locations within a surface map of roads contained in the HD map database 150. Thus, the vehicle location and roadway conditions confirmation layer 308 may function to determine a best guess location of a vehicle on a roadway based upon an arbitration between the received vehicle data and the HD map data. For example, while vehicle refined location and state information may place the subject vehicle near the middle of a two-lane road in the HD map, the vehicle location and roadway conditions confirmation layer 308 may determine from the direction of travel that the subject vehicle is most likely aligned with the travel lane consistent with the direction of travel. The vehicle location and roadway conditions confirmation layer 308 may pass map-based location information to the customized dynamic traffic control instruction generator layer 310.

The customized dynamic traffic control instruction generator layer 310 may utilize information from the vehicle location and roadway conditions confirmation layer 308 and the dynamic traffic control instructions analysis layer 306 to generate customized dynamic traffic control instructions for a subject vehicle. For example, the customized dynamic traffic control instructions generator layer 310 may plan a route to be followed by the subject vehicle to a particular destination. The customized dynamic traffic control instructions generator layer 310 may use dynamic traffic control instructions received from one or more other interactive traffic control devices 200 and/or the adaptive traffic management server 110 to identify a particular route the subject vehicle is being instructed to follow.

The customized dynamic traffic control instruction generator layer 310 may access, maintain, or be provided with registrations with owner/driver information that is matched to owner/driver identification information communicated by the subject vehicle, such as in the vehicle refined location and state information.

The customized dynamic traffic control instruction generator layer 310 of the dynamic traffic control system 300 may use the refined location and state information of the subject vehicle and location and state information of other vehicles and objects output from the vehicle location and roadway conditions confirmation layer 308 to predict future behaviors of other vehicles and/or objects. In this way, the customized dynamic traffic control instruction generator layer 310 may use such information to predict future relative positions of other vehicles in the vicinity of the subject vehicle based on the subject vehicle position and velocity and other vehicle positions and velocity. Such predictions may take into account information from the HD map and route planning to anticipate changes in relative vehicle positions on the roadway. The customized dynamic traffic control instruction generator layer 310 may output other vehicle and object behavior and location predictions to the motion planning and control layer 314.

Additionally, object behavior as well as location predictions from the customized dynamic traffic control instruction generator layer 310 may be used to plan and determine customized dynamic traffic control instructions for directing the route(s) or movements of the subject vehicle. For example, based on route planning information, refined location in the roadway information, and relative locations and motions of other vehicles, the customized dynamic traffic control instruction generator layer 310 may determine that the subject vehicle needs to change lanes and accelerate, such as to maintain or achieve minimum spacing from other vehicles, and/or prepare for a turn or exit. As a result, the customized dynamic traffic control instruction generator layer 310 may calculate or otherwise determine needed vehicle movement changes to transmit customized dynamic traffic control instructions to the subject vehicle, along with various parameters that may be necessary to effectuate such movement changes.

The communications manager layer 312 may transmit the customized dynamic traffic control instructions to the subject vehicle (i.e., autonomous vehicles 80 or non/semi-autonomous vehicles through wireless communication devices 190), as well as the adaptive traffic management server 110 and/or other interactive traffic control devices 200.

In various embodiments, the dynamic traffic control system 300 may include functionality that performs safety checks or oversight of various commands, planning or other decisions of various layers that could impact vehicle and occupant safety. Such safety check or oversight functionality may be implemented within a dedicated layer (not shown) or distributed among various layers and included as part of the functionality. In some embodiments, a variety of safety parameters may be stored in memory and the safety checks or oversight functionality may compare a determined value (e.g., relative spacing between vehicles on a roadway, distance from the roadway centerline, etc.) to corresponding safety parameter(s), and issue a warning or command (e.g., as part of the customized dynamic traffic control instructions) if the safety parameter is or will be violated.

Some safety parameters stored in memory may be static (i.e., unchanging over time), such as maximum vehicle speed. Other safety parameters stored in memory may be dynamic in that the parameters are determined or updated continuously or periodically based on refined location and state information and/or environmental conditions. Non-limiting examples of safety parameters include maximum safe speed, maximum brake pressure, maximum acceleration, and the safe wheel angle limit, all of which may be a function of roadway and weather conditions.

Figure 4A:
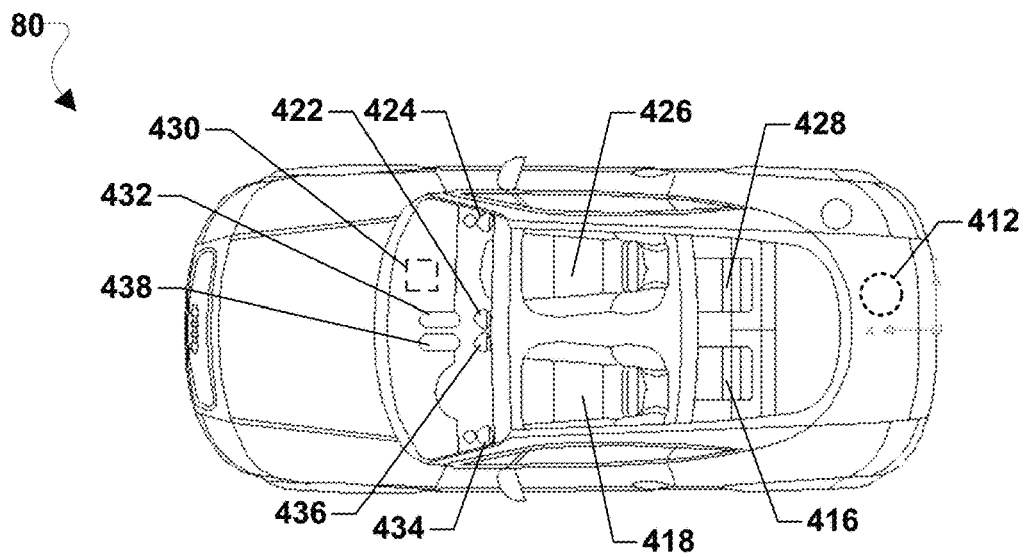
FIGS. 4A and 4B are schematic diagrams illustrating a vehicle suitable for implementing various embodiments.
Figure 4B:
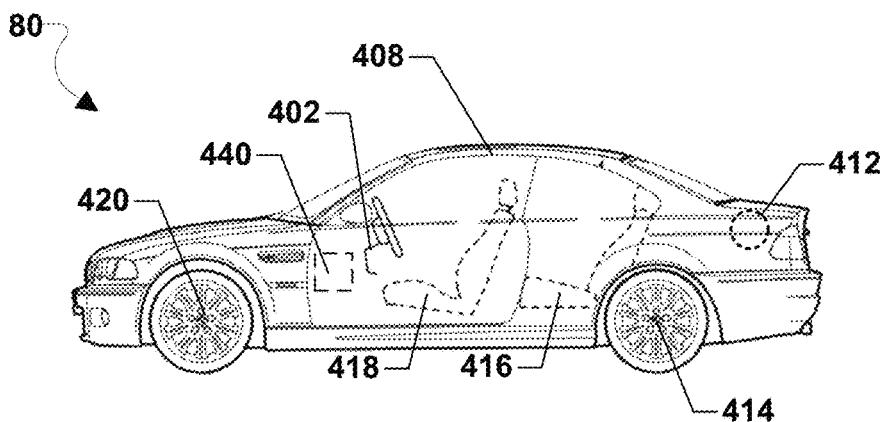

Various embodiments may be implemented to work with a variety of vehicles configured to determine refined location and state information and share such information with an adaptive traffic management system (e.g., by sending the information to one or more interactive traffic control devices and/or a server of such a system). An example autonomous vehicle 80 is illustrated in FIGS. 4A and 4B. With reference to FIGS. 4A and 4B, an autonomous vehicle 80 may include a plurality of sensors 402-438 disposed in or on the autonomous vehicle that are used for various purposes involved in autonomous and semiautonomous navigation as well as sensor data regarding objects and people in or on the autonomous vehicle 80. The sensors 402-438 may include one or more of a wide variety of sensors capable of detecting a variety of information useful for navigation and collision avoidance. Each of the sensors 402-438 may be in wired or wireless communication with a control unit 440, as well as with each other. In particular, the sensors may include one or more cameras 422, 436 or other optical sensors or photo optic sensors. The sensors may further include other types of object detection and ranging sensors, such as radar 432, lidar 438, IR sensors, and ultrasonic sensors. The sensors may further include tire pressure sensors 414, 420, humidity sensors, temperature sensors, satellite geo-positioning sensors 408, accelerometers, vibration sensors, gyroscopes, gravimeters, impact sensors 430, force meters, stress meters, strain sensors, fluid sensors, chemical sensors, gas content analyzers, pH sensors, radiation sensors, Geiger counters, neutron detectors, biological material sensors, microphones 424, 434, occupancy sensors 412, 416, 418, 426, 428, proximity sensors, and other sensors.

Figure 5:
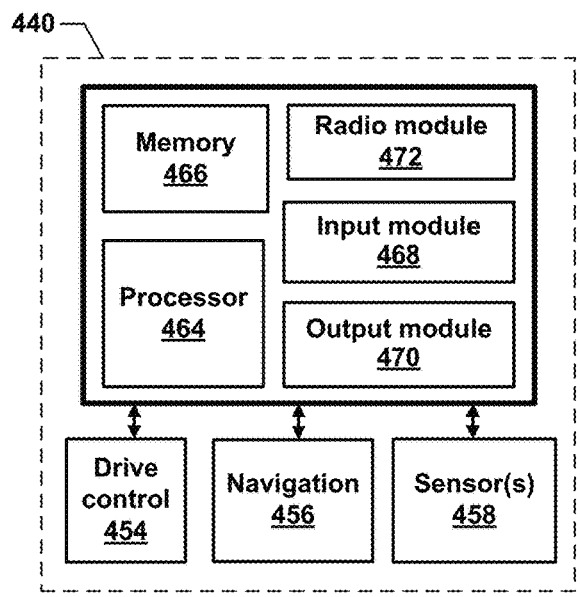
FIG. 5 is a schematic block diagram illustrating components of an example control unit for use in a vehicle in accordance with various embodiments.

FIG. 5 illustrates an example control unit 440 of the autonomous vehicle 80 suitable for implementing various embodiments in vehicles. With reference to FIGS. 1-5, the control unit 440 may include various circuits and devices used to control the operation of the autonomous vehicle (e.g., 80). The control unit 440 may be coupled to and configured to control the drive control components 454, navigation components 456, and one or more vehicle sensors 458 of the autonomous vehicle.

The control unit 440 may include a processor 464 configured with processor-executable instructions to control maneuvering, navigation, and other operations of the autonomous vehicle, including operations of various embodiments. The processor 464 may be coupled to a memory 466. The control unit 440 may include an input module 468, an output module 470, and a radio module 472.

The radio module 472 may be configured for wireless communication. The radio module 472 may exchange signals 182 (e.g., command signals for controlling maneuvering, signals from navigation facilities, etc.) with a network transceiver 180, and may provide the signals 182 to the processor 464 and/or the navigation component 456. The signals may be used by the radio module 472 to transmit refined location and state information and/or receive dynamic traffic instruction. In some embodiments, the radio module 472 may enable the autonomous vehicle to communicate with a wireless communication device 190 through a wireless communication link 192. The wireless communication link 192 may be a bidirectional or unidirectional communication link used in a similar way to the signals 182, and may use one or more communication protocols.

The input module 468 may receive sensor data from one or more vehicle sensors 458 as well as electronic signals from other components, including the drive control components 454 and the navigation components 456. The output module 470 may be used to communicate with or activate various components of the autonomous vehicle, including the drive control components 454, the navigation components 456, and the sensor(s) 458.

The control unit 440 may be coupled to the drive control components 454 to control physical elements of the autonomous vehicle related to maneuvering and navigation of the autonomous vehicle, such as the engine, motors, throttles, steering elements, flight control elements, braking or deceleration elements, and the like. The drive control components 454 may also include components that control other devices of the autonomous vehicle, including environmental controls (e.g., air conditioning and heating), external and/or interior lighting, interior and/or exterior informational displays (which may include a display screen or other devices to display information), and other similar devices.

The control unit 440 may be coupled to the navigation components 456, and may receive data from the navigation components 456 and be configured to use such data to determine the present position and orientation of the autonomous vehicle, as well as an appropriate course toward a destination. In various embodiments, the navigation components 456 may include or be coupled to a global navigation satellite system (GNSS) receiver system (e.g., one or more Global Positioning System (GPS) receivers) enabling the autonomous vehicle to determine its current position using GNSS signals. Alternatively, or in addition, the navigation components 456 may include radio navigation receivers for receiving navigation beacons or other signals (e.g., instructions from interactive traffic control device) from radio nodes, such as Wi-Fi access points, cellular network sites, radio station, remote computing devices, other vehicles, etc. Through control of the drive control components 454, the processor 464 may control the autonomous vehicle to navigate and maneuver. The processor 464 and/or the navigation components 456 may be configured to communicate with a server, such as an adaptive traffic management server 110, on a network 105 (e.g., the Internet) using a wireless connection 182 with a network transceiver 180 of a cellular or other data network to receive commands to control maneuvering, receive data useful in navigation, provide real-time position reports, and assess other data.

The control unit 440 may be coupled to one or more vehicle sensors 458. The sensor(s) 458 may include the sensors 402-438 as described, and may the configured to provide a variety of data to the processor 464.

While the control unit 440 is described as including separate components, in some embodiments some or all of the components (e.g., the processor 464, the memory 466, the input module 468, the output module 470, and the radio module 472) may be integrated in a single device or module, such as a system-on-chip (SOC) processing device. Such an SOC processing device may be configured for use in vehicles and be configured, such as with processor-executable instructions executing in the processor 464, to perform operations of various embodiments when installed into the autonomous vehicle.

In some embodiments, the control unit 440 and network transceiver 480 may communicate similar in one or more aspects to (or incorporated into) the functionality of a cellular IoT (CIoT) base station (C-BS), a NodeB, an evolved NodeB (eNodeB), radio access network (RAN) access node, a radio network controller (RNC), a base station (BS), a macro cell, a macro node, a Home eNB (HeNB), a femto cell, a femto node, a pico node, or some other suitable entity based on the radio technology used to establish the network-to-device links between the network transceiver 480 and the control unit 440. The network transceiver 180 may be in communication with respective routers that may connect to the network 105 (e.g., core network, Internet, etc.). Using the connections to the network transceiver 180, the control unit 440 may exchange data with the network 105 as well as devices connected to the network 105, such as the adaptive traffic management server 110 or any other communication device connected to the network 105.

The autonomous vehicle control unit 440 may be configured with processor-executable instructions to perform various embodiments using information received from various sensors, particularly the cameras 422, 436. In some embodiments, the control unit 440 may supplement the processing of camera images using distance and relative position (e.g., relative bearing angle) that may be obtained from radar 432 and/or lidar 438 sensors. The control unit 440 may further be configured to control steering, breaking and speed of the autonomous vehicle when operating in an autonomous or semiautonomous mode using information regarding other vehicles determined using various embodiments.

FIGS. 6A-11B illustrate interactive traffic control devices 200 in various states of display. With reference to FIGS. 1-11B, the interactive traffic control device 200 may convey various types of information and may change as directed by an adaptive traffic management system.

Figure 6A:
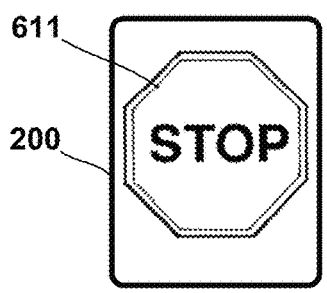
FIGS. 6A and 6B are graphical representations of displays on interactive traffic control device, changing from a stop sign to a yield sign, in accordance with various embodiments.
Figure 6B:
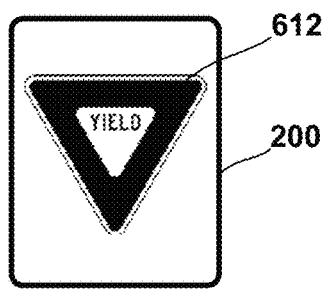

FIGS. 6A and 6B illustrate an example of an interactive traffic control device 200 in two different states of display 611, 612, which are suitable for implementing various embodiments. In FIG. 6A, the interactive traffic control device 200 displays a first state of display 611, which looks like a traditionally static stop sign. In FIG. 6B, the interactive traffic control device 200 has changed the display from the first state to a second state of display 612, which looks like a traditionally static yield sign. Alternatively, the interactive traffic control device 200 could change from either of the two different states of display 611, 612 to a blank display, a text alert message (e.g., "Beware, AMBER ALERT!" or "Buckle-up, it's the law"), or other display.

Figure 7A:
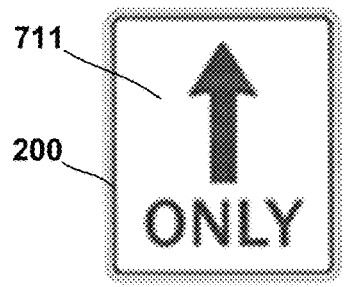
FIGS. 7A and 7B are graphical representations of displays on interactive traffic control device, changing from a straight ahead only sign to a right turn only sign, in accordance with various embodiments.
Figure 7B:
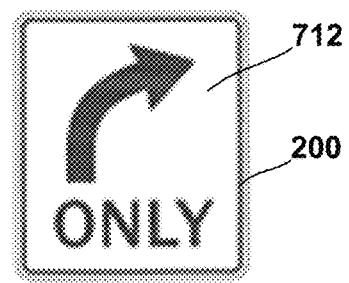

FIGS. 7A and 7B illustrate another example of an interactive traffic control device 200 in two different states of display 711, 712, which are suitable for implementing various embodiments. In FIG. 7A, the interactive traffic control device 200 displays a first state of display 711, which looks like a traditionally static 'straight ahead only' sign. In FIG. 7B, the interactive traffic control device 200 has changed the display from the first state to a second state of display 712, which looks like a traditionally static 'right turn only' sign. Alternatively, the interactive traffic control device 200 could change from either of the two different states of display 711, 712 to a blank display, a text alert message, or other display.

Figure 8A:
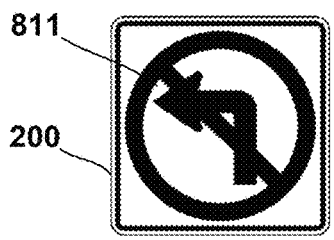
FIGS. 8A and 8B are graphical representations of displays on interactive traffic control device, changing from a no left turn sign to a blank sign, in accordance with various embodiments.
Figure 8B:
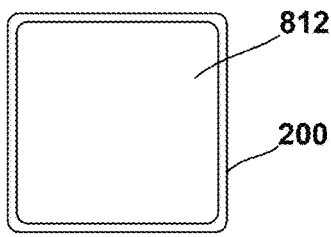

FIGS. 8A and 8B illustrate another example of an interactive traffic control device 200 in two different states of display 811, 812, which are suitable for implementing various embodiments. In FIG. 8A, the interactive traffic control device 200 displays a first state of display 811, which looks like a traditionally static 'no left turn' sign. In FIG. 8B, the interactive traffic control device 200 has changed the display from the first state to a second state of display 812, which looks blank. Alternatively, the interactive traffic control device 200 could change from either of the two different states of display 811, 812 to a text alert message or other display.

Figure 9A:
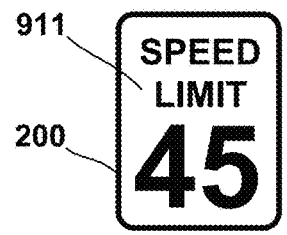
FIGS. 9A and 9B are graphical representations of displays on interactive traffic control device, changing from a 45 miles per hour (mph) speed limit sign to a 25 mph speed limit sign, in accordance with various embodiments.
Figure 9B:
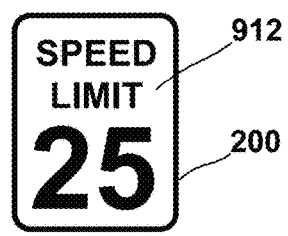

FIGS. 9A and 9B illustrate another example of an interactive traffic control device 200 in two different states of display 911, 912, which are suitable for implementing various embodiments. In FIG. 9A, the interactive traffic control device 200 displays a first state of display 911, which looks like a traditionally static speed limit sign, with a speed limit of 45 miles per hour. In FIG. 9B, the interactive traffic control device 200 has changed the display from the first state to a second state of display 912, which looks like another traditionally static speed limit sign, with a speed limit of 25 miles per hour. Alternatively, the interactive traffic control device 200 could change from either of the two different states of display 911, 912 to a text alert message or other display.

Figure 10A:
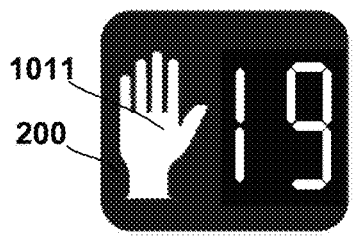
FIGS. 10A-10C are graphical representations of displays on interactive traffic control device, changing from two forms of a pedestrian cross-walk countdown signal to a do not cross sign, in accordance with various embodiments.
Figure 10B:
Figure 10C:
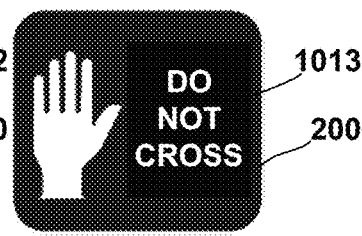

FIGS. 10A-10C illustrate another example of an interactive traffic control device 200 in three different states of display 1011, 1012, 1013 which are suitable for implementing various embodiments. In FIG. 10A, the interactive traffic control device 200 displays a first state of display 1011, which looks like a pedestrian cross-walk countdown signal, currently displaying that 19 seconds remain on the countdown. In FIG. 10B, the interactive traffic control device 200 has changed the display from the first state to a second state of display 1012, which advises pedestrians to "WALK" and includes another countdown currently displaying 10 seconds remaining. In FIG. 10C, the interactive traffic control device 200 has changed the display to a third state of display 1013, which advises pedestrians, "Do Not Cross." The "Do Not Cross" display may be used when the adaptive traffic management system is allowing vehicular traffic to cross through an intersection for an indeterminate amount of time. Alternatively, the interactive traffic control device 200 could change from any of the three different states of display 1011, 1012, 1013 to a text alert message or other display.

Figure 11A:
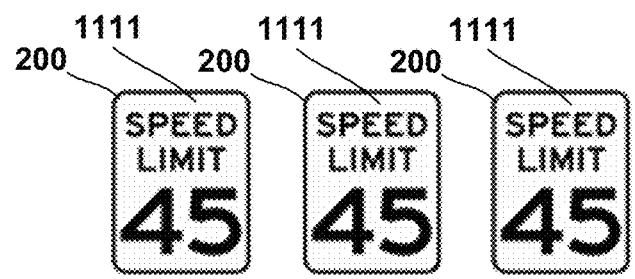
FIGS. 11A and 11B are graphical representations of displays on interactive traffic control device over a roadway, with one sign changing from a 45 mph speed limit sign to a Lane Closed (Change Lane) sign with an arrow, in accordance with various embodiments.
Figure 11A:
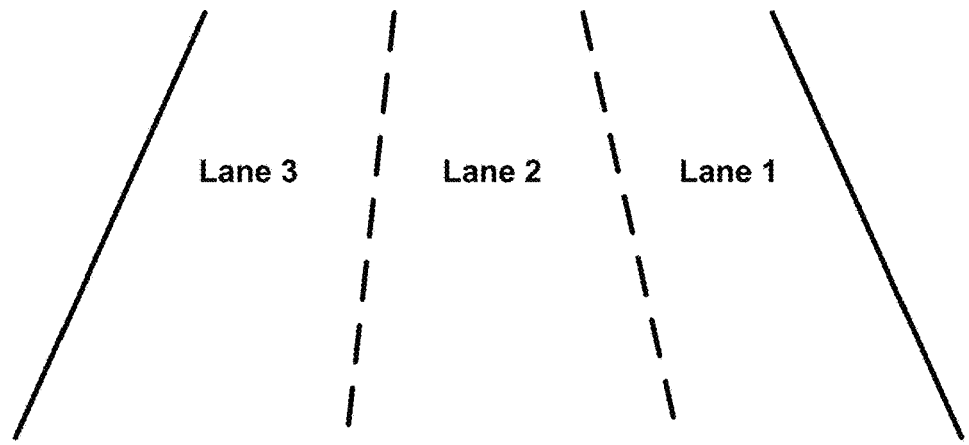
Figure 11B:
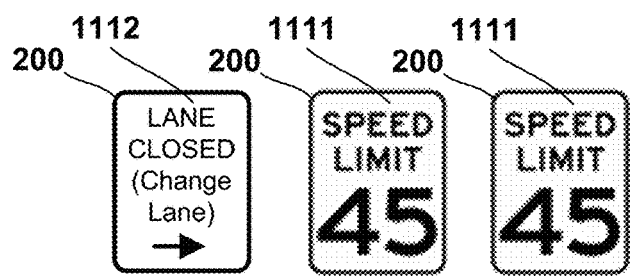
Figure 11B:
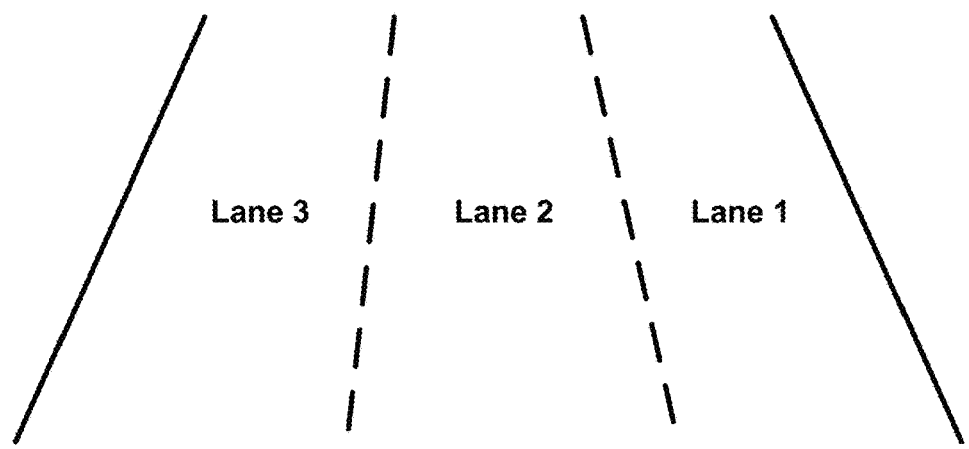

FIGS. 11 and 11B illustrate a portion of a roadway with three lanes each having an interactive traffic control device 200, which signs are suitable for implementing various embodiments. In FIG. 11A, all three of the interactive traffic control devices 200 display a first state of display 1111, which looks like a traditionally static speed limit sign, with a speed limit of 45 miles per hour. In FIG. 11B, the interactive traffic control devices 200 over Lane 1 and Lane 2 have not changed and are still displaying the first state (i.e., 45 mph). In contrast, the interactive traffic control device 200 over Lane 3 has changed the display to a second state of display 1112, which indicates, "LANE CLOSED (Change Lane)" and includes an arrow aiming right, which traffic should merge right. This type of 'Lane Closed' display may be used by the adaptive traffic management system to make a lane available for emergency vehicles or to clear a turn-lane for a particular vehicle (i.e., "protect a turn"). For example, a vehicle receiving favorable treatment by the adaptive traffic management system may have a left lane reserved for left turns or to provide a "fast lane" apart from other traffic. Alternatively, the interactive traffic control device 200 could change from either of the two different states of display 1111, 1112 to a text alert message or other display.

Figure 12:
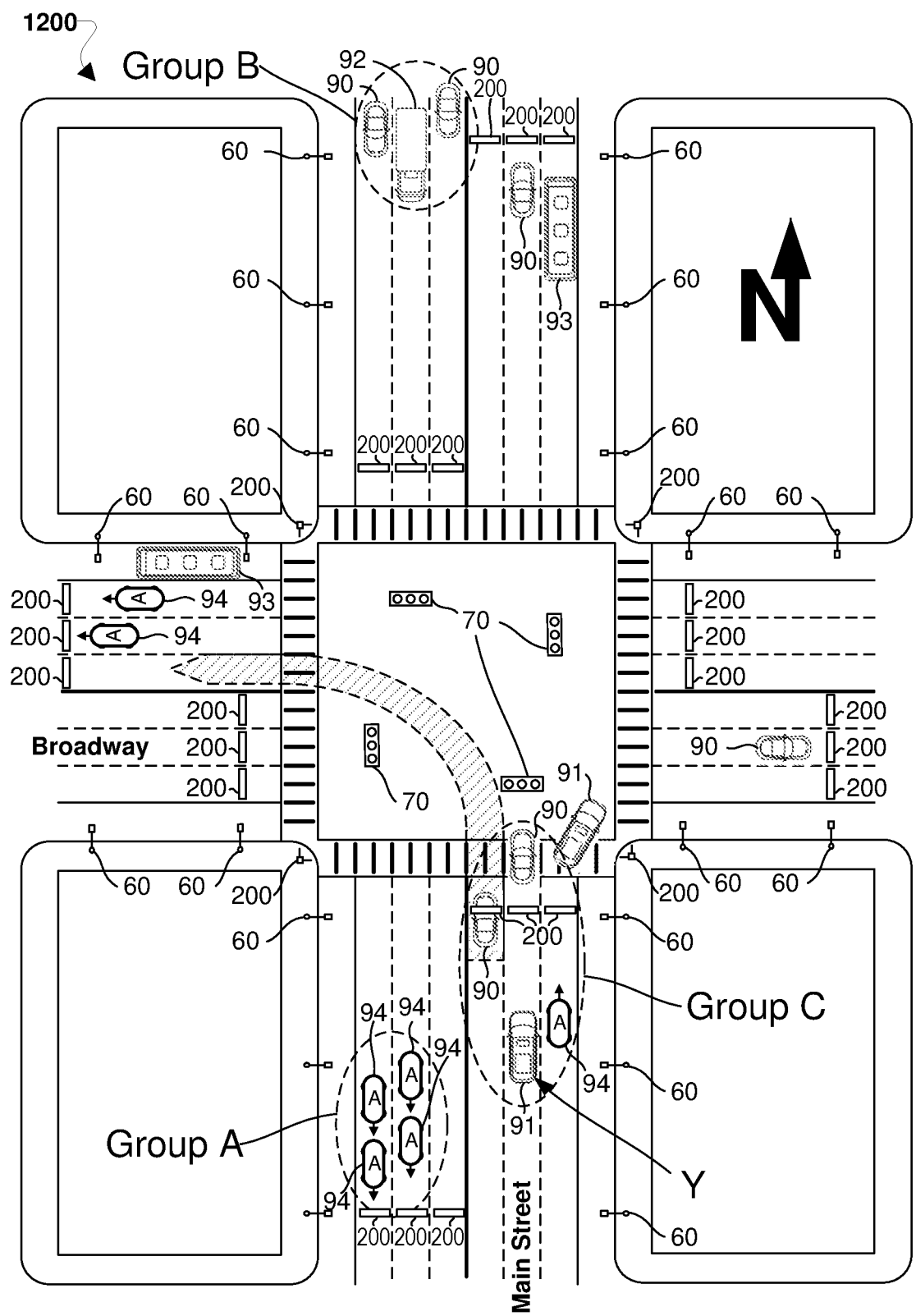
FIG. 12 is a graphical representation of a traffic environment that includes interactive traffic control device suitable for implementing various embodiments.

FIG. 12 illustrates a traffic environment 1200 that includes interactive traffic control devices 200 under control of an adaptive traffic management system 100 suitable for implementing various embodiments. With reference to FIGS. 1-12, the traffic environment represents an exemplary city intersection of Main Street, which has three north-bound lanes (i.e., toward the top of the page in the orientation shown), three south-bound lanes (i.e., toward the bottom of the page in the orientation shown), and a shoulder lane on each side of the street, and a street named Broadway, which has three east-bound lanes (i.e., toward the right of the page in the orientation shown), three west-bound lanes (i.e., toward the left of the page in the orientation shown), and a shoulder lane on each side of the street. Along the sides of both Main Street and Broadway there are numerous roadway sensors 60. Hanging in the center of the intersection are conventional traffic signaling devices 70. Also, positioned at various points over each of the lanes of the streets and on each of the four street corners are interactive traffic control device 200. Numerous autonomous vehicles and/or non-autonomous vehicles, including cars 90, SUVs 91, trucks 92, buses 93, and other non-traditional vehicles 94 (e.g., unmanned delivery or livery vehicles) are also illustrated as traveling in or near the city intersection of the traffic environment 1200.

The traffic environment 1200 is used for illustrative purposes to explain how an adaptive traffic management system (e.g., using an adaptive traffic management server 110) may manipulate vehicular traffic. In particular, the interactive traffic control device 200 and other traffic infrastructure elements may be used by the adaptive traffic management system to manipulate vehicles 90-93 and 80 operating in and around the intersection of Main Street and Broadway. For example, the adaptive traffic management system may receive location and speed information of the vehicles 90-93 and 80 from the sensors 60 and/or one or more of the interactive traffic control device 200 functioning as sensors. Additionally, the adaptive traffic management system may receive refined location and state information directly from the autonomous vehicles 80 or indirectly from the vehicles 90-93, such as via V2X wireless communications.

The adaptive traffic management system may use the received refined location and state information, as well as other roadway sensor data, to develop traffic management plans and vehicle-specific routing instructions and dynamic road sign displays for manipulating and controlling vehicular traffic. The refined location and state information from a particular vehicle, such as vehicle X, may not only indicate that vehicle X is traveling northbound on Main Street in the left-most north-bound lane, but may also include destination information that suggests that vehicle X needs to make a left-hand turn onto Broadway. Under normal conditions, vehicle X may be forced to stop at the intersection if either the traffic signaling device 70 is red or if oncoming traffic or cross-traffic blocks the turn. However, various embodiments enable the adaptive traffic management system to control the interactive traffic control device 200 and other traffic management infrastructure to ensure that vehicles, like vehicle X, avoid being required to stop at the intersection when there is no need to do so (e.g., no other vehicles are in or approaching the intersection), which may increase travel efficiencies for those vehicles. Although maintaining a turn lane free may slow down one or more other vehicles, under certain circumstances this technique may provide a net benefit to regional traffic flow, particularly if the delay to the other vehicle(s) will be nominal. In this way, the traffic management network may provide improved traffic flow.

For example, the adaptive traffic management system may develop traffic management plans and vehicle-specific routing instructions and dynamic road sign displays to help vehicle X avoid having to stop at the intersection by changing one or more of the traffic signaling devices 70 at the intersection. In particular, the north-bound traffic signals may be turned green and the traffic signals in every other direction may be turned red, if the timing is appropriate and the adaptive traffic management system also determines there are no other vehicles or pedestrians that might otherwise prevent the turn from being made safely by vehicle X. The presence of another vehicle or pedestrians may be determined from input received by the adaptive traffic management system from sensors 60 or one or more interactive traffic control device 200 functioning as sensors, as well as from V2X communications by the other vehicle. Thus, once customized dynamic traffic control instructions are determined for vehicle X, one or more of the interactive traffic control devices 200 may transmit the customized dynamic traffic control instructions to vehicle X (e.g., see, FIG. 14A). When vehicle X reaches Broadway, the light will be green and the turn can be made without stopping or slowing down more than is necessary to freely make the turn. In contrast, different customized dynamic traffic control instructions may be determined for and transmitted to vehicle Y (e.g., FIG. 14B).

As another example, the adaptive traffic management system may develop traffic management plans and vehicle-specific routing instructions and dynamic road sign displays to help vehicle X avoid having to stop at the intersection by setting up a protected turn for vehicle X, which may improve travel for vehicle X. As used herein, the expression "protected turn" refers to conditions in which vehicles and pedestrian traffic are kept out of parts of a roadway needed for a particular vehicle to make a turn, such as at an intersection. Ensuring a protected turn exists may require the management of one or more vehicular and/or pedestrian traffic conditions. A first condition for establishing a protected turn may be that the turn lane needed for the turn be clear. A second condition may be that the lane or part of the roadway being turned onto be clear (i.e., no cross-traffic in the target lane). To ensure the first two conditions are met, the adaptive traffic management system may make the interactive traffic control device 200 over the left-most north-bound lane on Main Street, near Broadway, and the left-most west-bound lane on Broadway, near Main Street, display "LANE CLOSED (Change Lane)" and include an arrow aiming right (e.g., the second state of display 1112 in FIG. 11B). A third condition is that on-coming traffic should not force the vehicle for which the turn is being protected to stop or slow-down. To ensure this third condition is met, the adaptive traffic management system may slow-down oncoming traffic, such as by extending the time of a red light for the on-coming traffic at an earlier intersection (e.g., an intersection north of Broadway). Alternatively, to ensure that the third condition is met, the adaptive traffic management system may slow-down oncoming traffic using interactive traffic control device 200 to reduce the speed limit to the south-bound lanes on Main Street (e.g., a change from the first display state 1111 to the second display state 1112 in FIGS. 11 and 11B).

As a further example, the adaptive traffic management system may develop traffic management plans and vehicle-specific routing instructions and dynamic road sign displays to set up a protected turn for vehicle X, by grouping vehicles using the interactive traffic control device 200 and other traffic management infrastructure. Various embodiments may encourage two or more vehicles to travel as a close group to proactively alter the schedule of traffic lights or other traffic controls for managing traffic flow. Active traffic management may attempt to maintain vehicles in a group and collectively manage that group, rather than manage individual vehicles in the group. By grouping vehicles, the system may form gaps between those groups that may be used to allow cross-traffic to cut across at intersections without slowing down either the group or the cross-traffic. For example, the adaptive traffic management system may issue commands to autonomous vehicles 80 to stay in a group, such as Group A traveling south-bound on Main Street, south of Broadway. Also, the adaptive traffic management system may use traffic controls, such as delayed traffic lights or altered speed limits to group non-autonomous vehicles to stay in a group, such as Group B traveling south-bound on Main Street, north of Broadway and Group C traveling near vehicle X north-bound on Main Street. Groupings of vehicles like Groups A, B, and C may have been achieved well before those vehicles approached the intersection of Main Street and Broadway. By spacing out Group A and Group B, the adaptive traffic management system may create a gap for vehicle X to cross the south-bound lanes and make a turn.

Coordinating the travel routes of multiple vehicles may provide synergies that may benefit all vehicles involved. For example, issuing vehicle-specific routing instructions and/or generating dynamic road sign displays suggesting that a first vehicle stay out of the left lane may speed up travel for the first vehicle by avoiding other vehicles making turns in that lane, while also freeing-up the left lane for a second vehicle (i.e., providing a "protected left turn"). Also, issuing vehicle-specific routing instructions having a first vehicle move from traveling in the right lane to traveling in the left lane may change the time that the first vehicle interferes with a turn by a second vehicle in the oncoming direction, thus only inconveniencing the first vehicle in a minor way, while potentially allowing the second vehicle to make an unimpeded turn across the path of the second vehicle (due to the adjusted timing).

As a further example, during rush-hour, before a large entertainment event or in response to congestion (e.g., from an accident), a particular road or lane may experience heavy traffic. In such cases, the adaptive traffic management system may develop traffic management plans and vehicle-specific routing instructions and dynamic road sign displays to reroute some of the vehicles or encourage them to reroute, which gets those vehicles where they are going faster and lightens up that otherwise crowded road or lane for other traffic. Similarly, rerouting some of the cross-traffic originally headed toward the intersection in question (to perhaps a marginally less convenient path) may also help the otherwise crowded turning lane. Additionally or alternatively, during rush-hour or in response to congestion, the adaptive traffic management system may activate moveable highway barriers, mobile traffic cones, or the like, to increase/decrease the number of traffic lanes in a direction to alleviate the congestion.

As a further example, promoters, property managers, or other parties may inform the adaptive traffic management system ahead of time that a large event or other congestion-causing scenario may occur, thereby enabling the adaptive traffic management system to anticipate congestion and generate vehicle-specific routing instructions and dynamic road sign displays to reroute traffic accordingly. For example, concert venue managers often hire police or other traffic control personnel to help with congestion outside the venue. Instead, the venue manager may cause a notification to be sent to the adaptive traffic management system, which may in-turn develop traffic management plans and vehicle-specific routing instructions and dynamic road sign displays to reroute vehicles that would otherwise get caught up in traffic related to the event. Also, if a secondary route used for rerouting is substantially different, vehicle-specific routing instructions may give an operator or vehicle a choice for which route they prefer. As yet a further example, if a drawbridge is scheduled to go up at a certain time, the adaptive traffic management system may develop traffic management plans and vehicle-specific routing instructions and dynamic road sign displays to reroute vehicles that would otherwise get delayed from the drawbridge stopping traffic (e.g., rerouting traffic at an exit before the bridge).

A significant number of vehicle operators on roadways will tend to obey traffic signs and signals or an official in-vehicle message equivalent. However, many operators or vehicle owners may choose to ignore or disregard interactive traffic control device 200 or in-vehicle traffic control related messages. Thus, in accordance with various embodiments the adaptive traffic management system may use incentives to encourage or passively control operator behavior. For example, instructions may be communicated to a vehicle, which the vehicle operator or onboard autonomous system may elect to obey in exchange for a reward or credit.

In various embodiments, credits may be earned by vehicle operators for obeying traffic management instructions, such as following a recommended traffic route. Once a credit is earned, that credit may be used later at a vehicle operator's discretion to receive preferred or favorable vehicle treatment by the Thus, in accordance with various embodiments the adaptive. Favorable vehicle treatment may include providing priority or better travel efficiencies to a vehicle, as opposed to the treatment normally afforded most vehicles managed by the traffic management network.

Various embodiments provide more than one way to accrue credits. For example, if a vehicle stays in a particular lane as indicated by an interactive traffic control device (e.g., which may keep a turning lane clear), that vehicle may earn a credit that may be used at a later time. Also, if a non-autonomous vehicle travels at a lower speed indicated by an intelligent and adaptive traffic sign, the operator of that non-autonomous vehicle may earn a credit. Similarly, if a vehicle comes to a complete stop at a stop sign, does not come to a complete stop at a yield sign, or otherwise follows the instructions indicated by an intelligent and adaptive traffic sign, the operator of that vehicle may earn a credit.

Various embodiments include more than one way to use accrued credits. For example, after accruing at least one credit, an operator of the vehicle may choose to use that credit to receive more favorable treatment in terms of dynamic signs, speed limits and/or preferential routing that may reduce travel time. For example, the operator may elect to use the credit because the operator is late for an appointment or just wants to get to a destination faster. The operator may use one or more credits to request his/her vehicle encounter only green lights or mostly green lights along a given route. Alternatively, the operator may use one or more credits to receive traffic information, such as an indication as to which lane of traffic is moving the fastest or what speed to maintain in order to avoid being stopped by traffic lights. As a further alternative, the operator may use one or more credits to gain lawful access to high occupancy vehicle (HOV) lanes that the vehicle may not otherwise by entitled to use (i.e., heightened roadway access). As a further example, the system may direct the credited vehicle to a caravan or group of other vehicles that have a similar route or part of a route, in order to get the credited vehicle to its destination faster.

For purposes of the credit system, vehicles without communications connectivity to the adaptive traffic management system (e.g., non-autonomous vehicles without a wireless communication device) may receive credits when the system observes such vehicles following traffic management instructions. The adaptive traffic management system may observe such vehicle behavior via cameras or other sensors (e.g., 60) that can identify vehicles, such as through their license plates or other tags.

In a further embodiment, the adaptive traffic management system may charge a demerit (e.g., subtract one or more credits) to operators of vehicles that do not follow traffic instructions provided by the adaptive traffic management system. Demerits may involve fees charged to vehicle owner/operator accounts (i.e., like a fine). In this way, various embodiments may monetize the system of traffic management by charging vehicle owners or operators when providing traffic information, more favored treatment, or when vehicles do not cooperate.

In a further embodiment, the adaptive traffic management system may generate vehicle-specific routing instructions and dynamic road sign displays that deny access to operators and/or vehicle based on parameters. For example, one or more trucks containing potentially hazardous materials may be denied access to (i.e., kept from) certain roads or locations (e.g., schools, small or neighborhood roads, or other vulnerable places). As a further example, large vehicle may be denied access to areas with tight turns or corners, such as urban streets.

Figure 13:
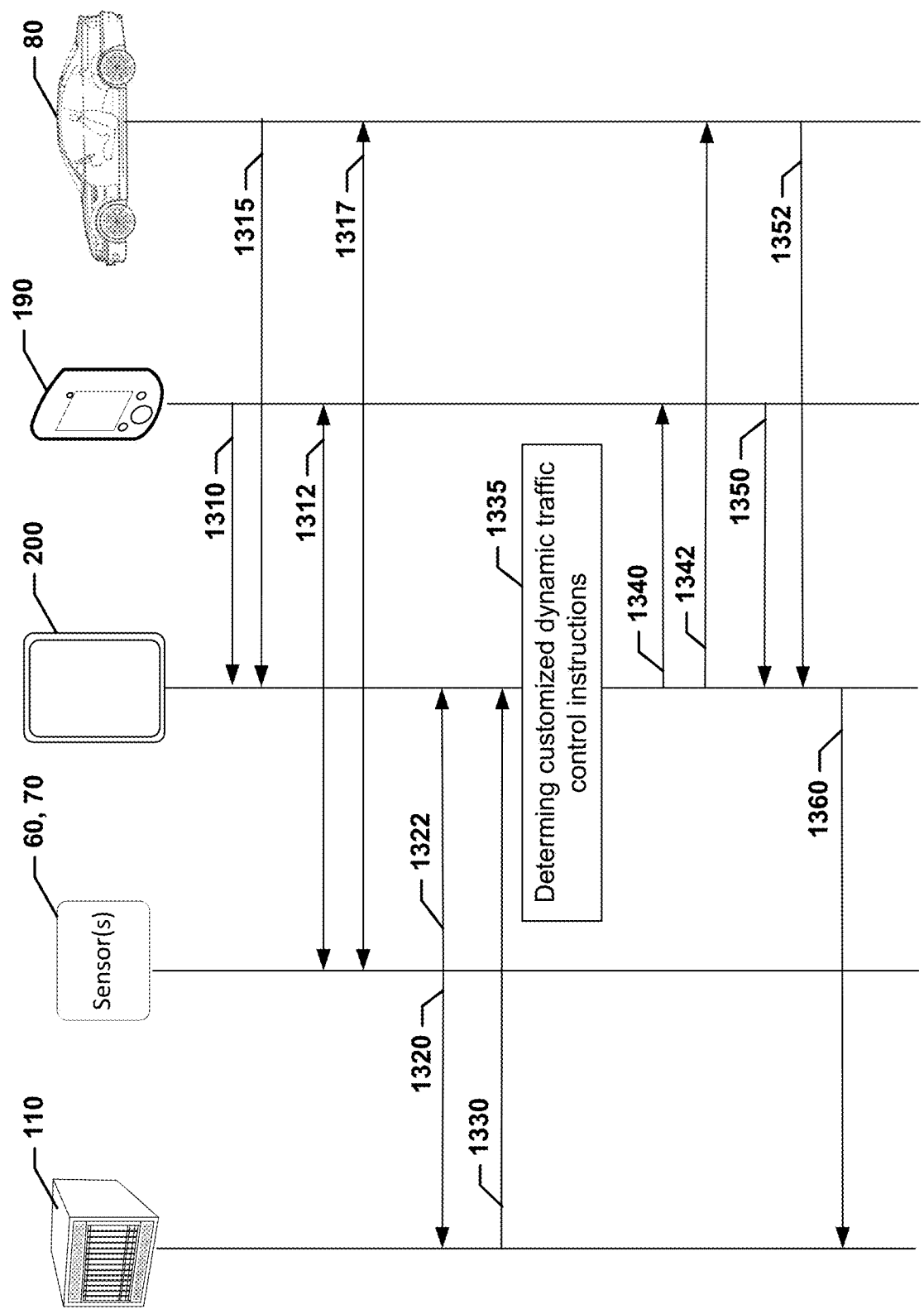
FIG. 13 is a communication flow diagram in accordance with various embodiments.

FIG. 13 illustrates communication flows of an adaptive traffic management system used to determine and transmit customized dynamic traffic control instructions, in accordance with various embodiments. With references to FIGS. 1-13, the interactive traffic control device 200 may receive communications from and communicate with the adaptive traffic management server 110 and various traffic management infrastructure elements (e.g., roadway sensors 60, and conventional traffic signaling devices 70 configured to collect and communicate information) and vehicles on roadways managed by the traffic management system, such as autonomous vehicles 80 or non/semi-autonomous vehicles 90 through wireless communication devices 190.

The interactive traffic control device 200 may receive vehicle communications 1310, 1315 from the autonomous vehicles 80 or wireless communication devices 190 in the non/semi-autonomous vehicles 90. The vehicle communications 1310, 1315 may include refined location and state information associated with individual vehicles (e.g., 80, 90) on a roadway. In addition, traffic management infrastructure elements (e.g., 60, 70) may collect data 1312, 1317 from the autonomous vehicles 80 or wireless communication devices 190, which data 1312, 1317 may include sensor data (e.g., providing vehicle identity, direction of travel, speed, current location, etc.) and/or refined location and state information. The data may be collected by using one-way or bi-directional wireless communications or unilateral sensor measurements. The traffic management infrastructure elements 60, 70 may in-turn transmit collected traffic data 1320 to the adaptive traffic management server 110. The collected traffic data 1320 may include the sensor data and/or refined location and state information received from the autonomous vehicles 80 or wireless communication devices 190.

In various embodiments, some traffic management infrastructure elements 60, 70 in close proximity to a particular interactive traffic control device 200 (e.g., within a designated area or distance from the interactive traffic control device 200) may transmit collected localized data 1322 to an associated interactive traffic control device 200. The collected localized data 1322 may similarly include the sensor data and/or refined location and state information received from the autonomous vehicles 80 or wireless communication devices 190. Alternatively, or additionally, the adaptive traffic management server 110 may transmit dynamic traffic control information 1330 to the interactive traffic control device 200. The dynamic traffic control information 1330 may include the sensor data and/or refined location and state information received from the autonomous vehicles 80 or wireless communication devices 190.

In response to receiving at least one of the vehicle communications 1310, 1315, the collected localized data 1322, and the dynamic traffic control information 1330, the interactive traffic control device 200 may determine customized dynamic traffic control instructions 1335 for individual vehicles on a roadway. The determined customized dynamic traffic control instructions 1335 may include navigational information modified for one or more particular vehicles on a roadway or intersection adjacent the interactive traffic control device 200. The navigational information may be any information provided to a vehicle relating to a route or movements of that vehicle on a roadway. For example, the navigational information may include instructions like those traditionally conveyed by regulatory signs, warning signs, temporary traffic control signs. In addition, the navigational information may communicate customized textual or graphic instructions (e.g., "Stay in your lane," "Make the next left," "Follow the car ahead of you," etc.) to give guidance to one or more specific vehicles.

In addition, the interactive traffic control device 200 may determine different customized dynamic traffic control instruction for a first one or more vehicles as compared to a second one or more vehicles. Also, although different instructions are being provided, the first and second one or more vehicles may be traveling on the same roadway or at the same intersection within close proximity of one another (e.g., within a few hundred yards or within visible range). For example, a first one or more vehicles may be instructed to make an upcoming left turn after the interactive traffic control device 200 determines that traffic congestion ahead will otherwise significantly slow-down the first one or more vehicles. In contrast, a second one or more vehicles may be instructed not to turn and "stay in lane" after the interactive traffic control device 200 determines that the new route provided to the first one or more vehicles would not suit the second one or more vehicles.

Once determined, the interactive traffic control device 200 may transmit customized dynamic traffic control instructions 1340, 1342 to one or more specific individual vehicles, such as directly to the autonomous vehicles 80 or to non-autonomous vehicles (e.g., 90) by way of the wireless communication devices 190. The customized dynamic traffic control instructions 1340, 1342 may include first customized dynamic traffic control instructions 1340 for a first one or more of the individual vehicles and second customized dynamic traffic control instructions 1342 for a second one or more of the individual vehicles different from the first one or more of the individual vehicles. The first and second customized dynamic traffic control instructions 1340, 1342 may be transmitted contemporaneously to the first and second one or more of the individual vehicles. Alternatively, first and second customized dynamic traffic control instructions 1340, 1342 may be transmitted at different times to the first and second one or more of the individual vehicles.

In various embodiments, the autonomous vehicles 80 or the wireless communication devices 190 may transmit a response 1350, 1352 to the interactive traffic control device 200, which may be an acknowledgement of the customized dynamic traffic control instructions, an acceptance thereof (i.e., indicating an intent by the vehicle or vehicle operator to follow the customized dynamic traffic control instructions), a rejection thereof, or some other response. Additionally, the interactive traffic control device 200 may transmit an update 1360 to the adaptive traffic management server 110 with state information indicating what customized dynamic traffic control instructions are currently being displayed or otherwise communicated by the interactive traffic control device 200. Optionally, the interactive traffic control device 200 may provide the adaptive traffic management server 110 with a historic and a currently-planned future state schedule.

Figure 14A:
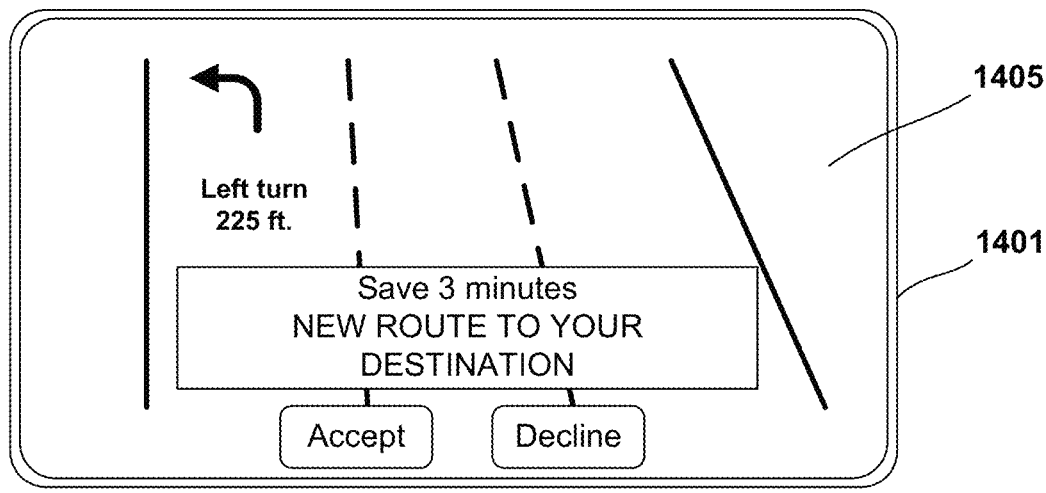
FIGS. 14A and 14B are graphical representations of displays 501, 511 on in-vehicle computing devices showing customized dynamic traffic control instructions, in accordance with various embodiments.
Figure 14B:
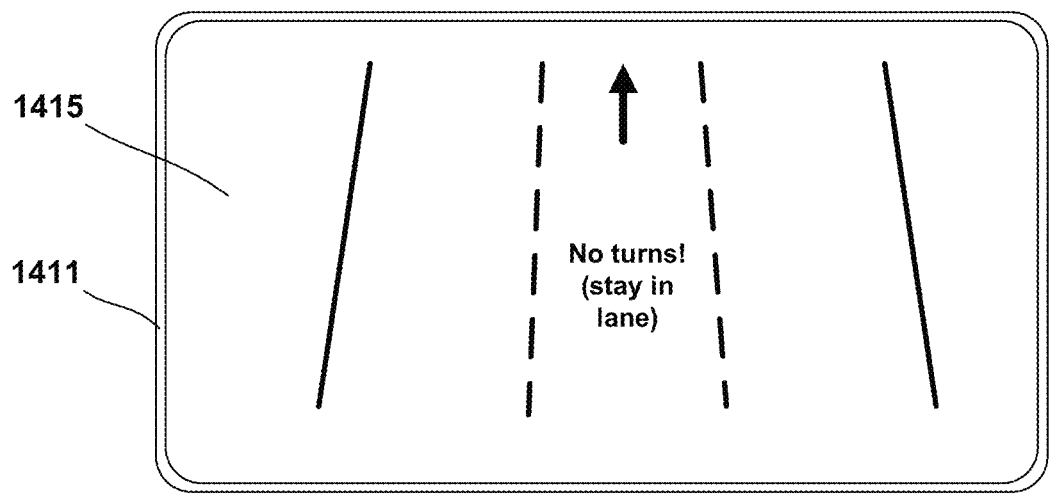

FIGS. 14A and 14B illustrate first and second vehicle displays 1401, 1411 showing first and second customized dynamic traffic control instructions 1405, 1415. The first and second vehicle displays 1401, 1411 may be part of the graphical user interfaces of two separate wireless communication devices (e.g., 190) located in different vehicles. The first customized dynamic traffic control instructions 1405 are illustrated as being displayed on the first vehicle display 1401. The first customized dynamic traffic control instructions 1405 may also be displayed in one or more other vehicles (i.e., a first set of vehicles), if the adaptive traffic management server 110 and/or a local interactive traffic control device 200 determines that more than one first vehicle should receive the first customized dynamic traffic control instructions 1405. Similarly, second customized dynamic traffic control instructions 1415 are illustrated as being displayed on the second vehicle display 1411. The second customized dynamic traffic control instructions 1415 may also be displayed in one or more other vehicles (i.e., a second set of vehicles), if the adaptive traffic management server 110 and/or a local interactive traffic control device 200 determines that more than one second vehicle should receive the second customized dynamic traffic control instructions 1415. The first and second customized dynamic traffic control instructions 1405, 1415 may have been transmitted from an interactive traffic control device 200 that the first and second set of vehicles are approaching.

The first vehicle display 1401 is illustrated as including the first customized dynamic traffic control instructions 1405 suggesting that the vehicle make a left turn in 225 feet. In addition, the first customized dynamic traffic control instructions 1405 may alert the viewer thereof that the displayed navigational instructions will "Save [them] 3 minutes" and are part of a "NEW ROUTE TO YOUR DESTINATION." In addition, the first customized dynamic traffic control instructions 1405 may include an optional alternative route that a vehicle occupant may 'accept' or 'decline,' but which is not presented as part of the second customized dynamic traffic control instructions 1415. The second vehicle display 1411 may include the second customized dynamic traffic control instructions 1415 instructing that the vehicle should make "No turns!" and "stay in lane."

Figure 15:
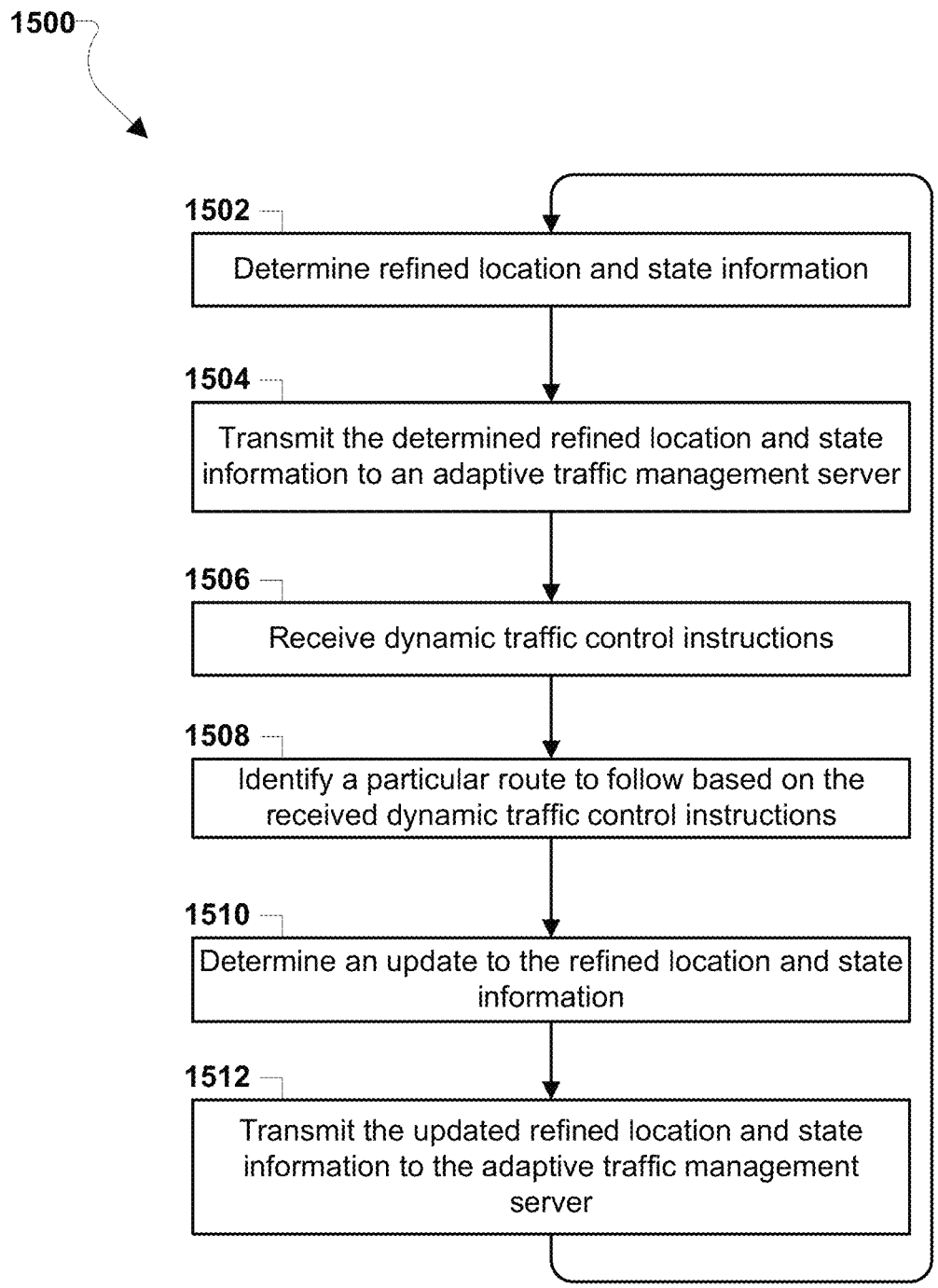
FIG. 15 is a process flow diagram of an example method of determining and transmitting an update to refined location and state information, according to various embodiments.

FIG. 15 is a process flow diagram illustrating a method 1500 of receiving customized dynamic traffic control instructions that may be implemented in accordance with various embodiments. With reference to FIGS. 1-15, the method 1500 may be performed by a processor, such as the processor (e.g., 464 in FIG. 4) of the control unit (e.g., 440 in FIG. 4) in the autonomous vehicle (e.g., 80).

In block 1502, the dynamic traffic control system (e.g., 300) of a vehicle may determine refined location and state information. For example, the vehicle location and roadway conditions continuation layer (e.g., 308) may receive data and outputs produced by a sensor perception layer (e.g., 302), vehicle refined location and state analysis layer (e.g., 304), HD map database (e.g., 105), and other interactive traffic control devices (e.g., 200), and use some or all of such inputs to determine or refine the location and state of the autonomous vehicle in relation to the road, other vehicles on the road, and other objects within a vicinity of the autonomous vehicle.

In block 1504, the control unit of the autonomous vehicle may transmit the determined refined location and state information to an adaptive traffic management server. For example, the control unit may use a radio module (e.g., 472 in FIG. 4) to transmit the refined location and state information to an adaptive traffic management server (e.g., 110), via a network transceiver (e.g., 180), a wireless communication device (e.g., 190), sensors (e.g., 60), augmented conventional traffic signaling devices (e.g., 70), and/or interactive traffic control device (e.g., 200).

In block 1506, the control unit may receive dynamic traffic control instructions. The control unit may also use the radio module to receive the dynamic traffic control instruction from the adaptive traffic management server, via the network transceiver, the wireless communication device, the sensors, the augmented conventional traffic signaling devices, and/or the interactive traffic control device.

In block 1508, the control unit may identify a particular route to follow based on the received dynamic traffic control instructions. For example, a customized dynamic traffic control instruction generator (e.g., 310) may utilize the received dynamic traffic control instructions and/or other inputs, such as from an operator or dispatcher, to plan a route to be followed by the vehicle to a particular destination.

In block 1510, the control unit may determine an update to the refined location and state information. For example, based on the route identified in block 1508, the vehicle location and roadway conditions confirmation layer (e.g., 308) in a dynamic traffic control system (e.g., 300) may determine and update the refined location and state information for the autonomous vehicle in relation to the road, other vehicles on the road, and other objects within a vicinity of the autonomous vehicle.

In block 1512, the control unit may transmit the updated refined location and state information to the adaptive traffic management server. Similar to block 1504, the control unit may use the radio module to transmit the updated refined location and state information to the adaptive traffic management server, via the network transceiver, the wireless communication device, the sensors, the augmented conventional traffic signaling devices, and/or the interactive traffic control device. In various embodiments, after or while transmitting the updated refined location and state information, the control unit may continue or once again determine refined location and state information in block 1502.

Figure 16:
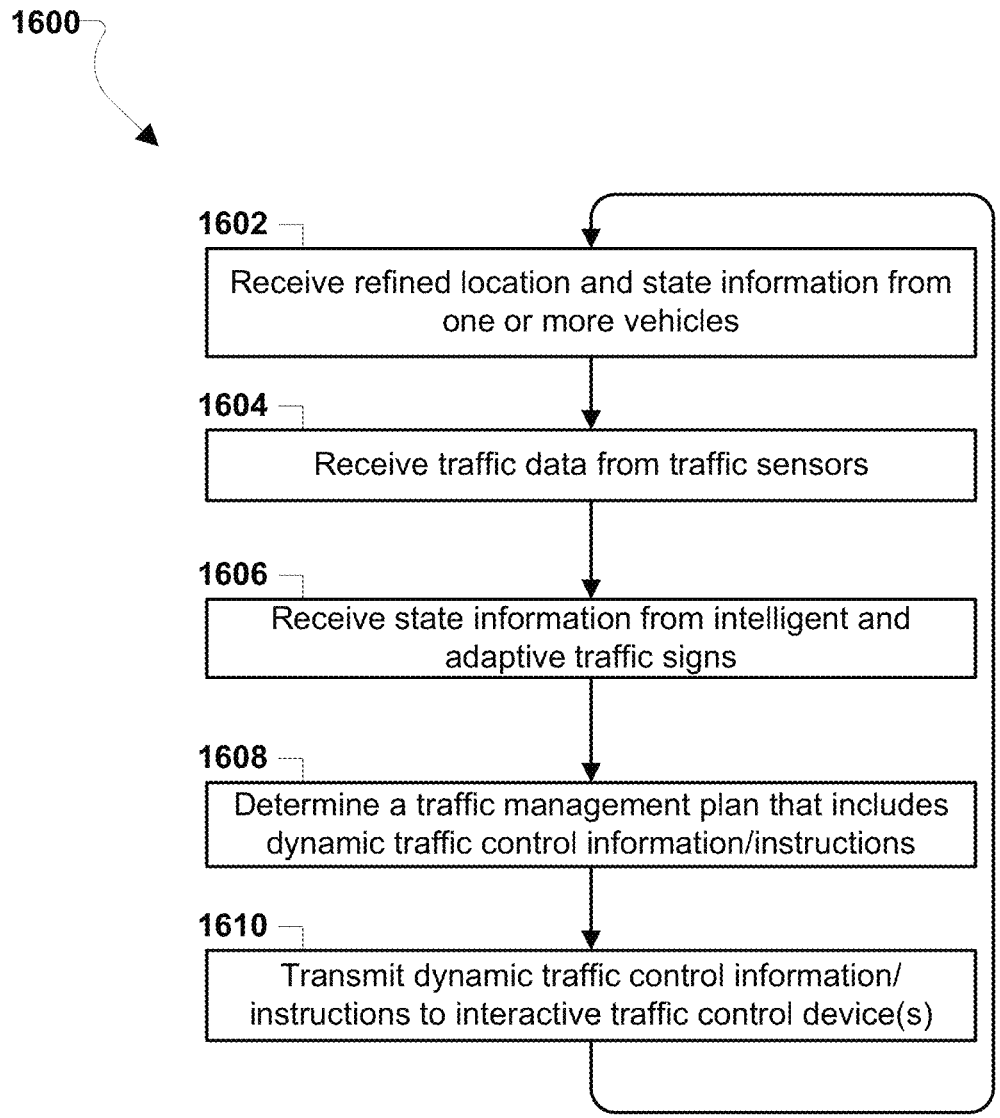
FIG. 16 is a process flow diagram of an example method of managing an adaptive traffic management system according to various embodiments.

FIG. 16 is a process flow diagram illustrating a method 1600 of managing an adaptive traffic management system that may be implemented in accordance with various embodiments. With reference to FIGS. 1-16, the method 1600 may be performed by a processor in a server, such as the adaptive traffic management server (e.g., 110), the sign/signal management server (e.g., 120), and/or the vehicle control server (e.g., 130).

In block 1602, the server may receive refined location and state information from one or more vehicles. For example, an autonomous vehicle or a wireless communication device 190 may transmit the refined location and state information to adaptive traffic management server 110.

In block 1604, the server may receive traffic data from roadway sensors. For example, roadway sensors 60, augmented conventional traffic signaling devices 70, and/or the interactive traffic control device 200 acting as sensors may transmit traffic data to the server.

In block 1606, the server may receive state information from interactive traffic control device. The interactive traffic control device may update the adaptive traffic management server with state information (current, previous, and/or future) indicating what instructions are currently being display or otherwise communicated by the intelligent and adaptive traffic sign.

In block 1608, the server may determine a traffic management plan that includes an update of dynamic traffic control instructions. Based on the refined location and state information received in block 1602, the traffic data received in block 1604, and the state information from interactive traffic control device received in block 1606, the server may determine and update the traffic management plan for one or more vehicles.

In block 1610, the server may transmit update(s) of dynamic traffic control instruction to one or more interactive traffic control device. In various embodiments, after or while transmitting the update(s) of the dynamic traffic control instructions, the adaptive traffic management server may continue or once again receive determine refined location and state information in block 1602.

Figure 17:
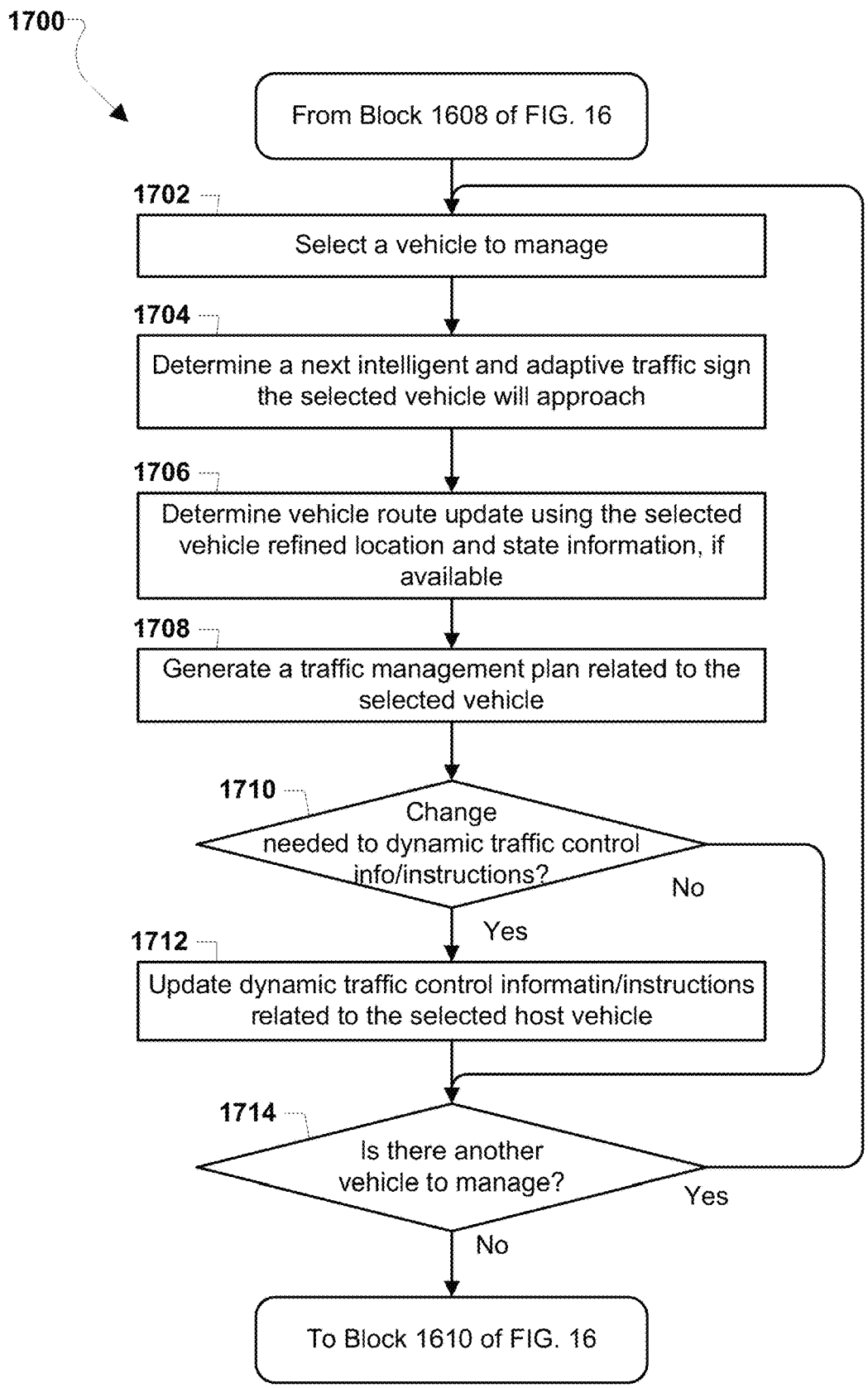
FIG. 17 is a process flow diagram of an example method of determining and transmitting vehicle-specific updates for interactive traffic control device to communicate dynamic traffic control instructions according to various embodiments.

FIG. 17 is a process flow diagram illustrating a method 1700 of generating and transmitting vehicle-specific updates for interactive traffic control device to communicate dynamic traffic control instructions that may be implemented in accordance with various embodiments. With reference to FIGS. 1-17, the method 1700 may be performed by a processor of a server, such as an adaptive traffic management server (e.g., 110), a sign/signal management server (e.g., 120), and/or a vehicle control server (e.g., 130). The method 1700 provides an example of a vehicle-specific determination that may be made in block 1608 of the method 1600. The server may make determinations about numerous specific vehicles, which may be done in parallel, in series, or a combination thereof In block 1702, the server may identify or select a vehicle to manage. Vehicles on roadways managed by the server may be observed and their behaviors analyzed for traffic management and planning. All vehicles on roadways managed by the server may be separately selected for detailed traffic management analysis by the server. Alternatively, a subset of vehicular traffic may be selected for detailed traffic management analysis by the server. For example, vehicles for which refined location and state information is received may be selected for detailed analysis while other vehicles, while considered as part of the traffic analysis and management, may only be analyzed or treated in a generalized way.

In block 1704, the server may determine a next intelligent and adaptive traffic sign that the selected vehicle will approach. The server may utilize HD map information available from a database (e.g., 115) and the refined location and state information specific to the selected vehicle in order to determine which of the interactive traffic control device controlled by the server will next be approached by the selected vehicle.

In block 1706, the server may determine a vehicle route update using the selected vehicle refined location and state information, if available. The server may also utilize the HD map information and the refined location and state information specific to the selected vehicle in order to determine any updates to the vehicle route that may be needed or suggested for the selected vehicle.

In block 1708, the server may generate a traffic management plan related to the selected vehicle. Based on the next intelligent and adaptive traffic sign determined in block 1704 and the vehicle route update determined in block 1706, the server may generate a vehicle-specific update to the traffic management plan.

In determination block 1710, the server may determine whether a change to dynamic traffic control instructions is needed based on the determination in block 1708. In response to determining that a change to dynamic traffic control instructions is needed (i.e., determination block 1710="Yes"), the server may update dynamic traffic control instructions related to the selected vehicle in block 1712.

In response to determining that no change to dynamic traffic control instructions is needed (i.e., determination block 1710="No") or after updating the dynamic traffic control instructions in block 1712, the server may determine whether another vehicle needs to be managed in determination block 1714.

In response to determining that another vehicle needs to be managed (i.e., determination block 1714="Yes"), the server may again identify or select a vehicle to manage in block 1702. In response to determining that no other vehicle needs to be managed (i.e., determination block 1714="No"), the server may transmit update(s) of dynamic traffic control instructions to interactive traffic control device in block 1610 of the method 1600 as described.

Figure 18:
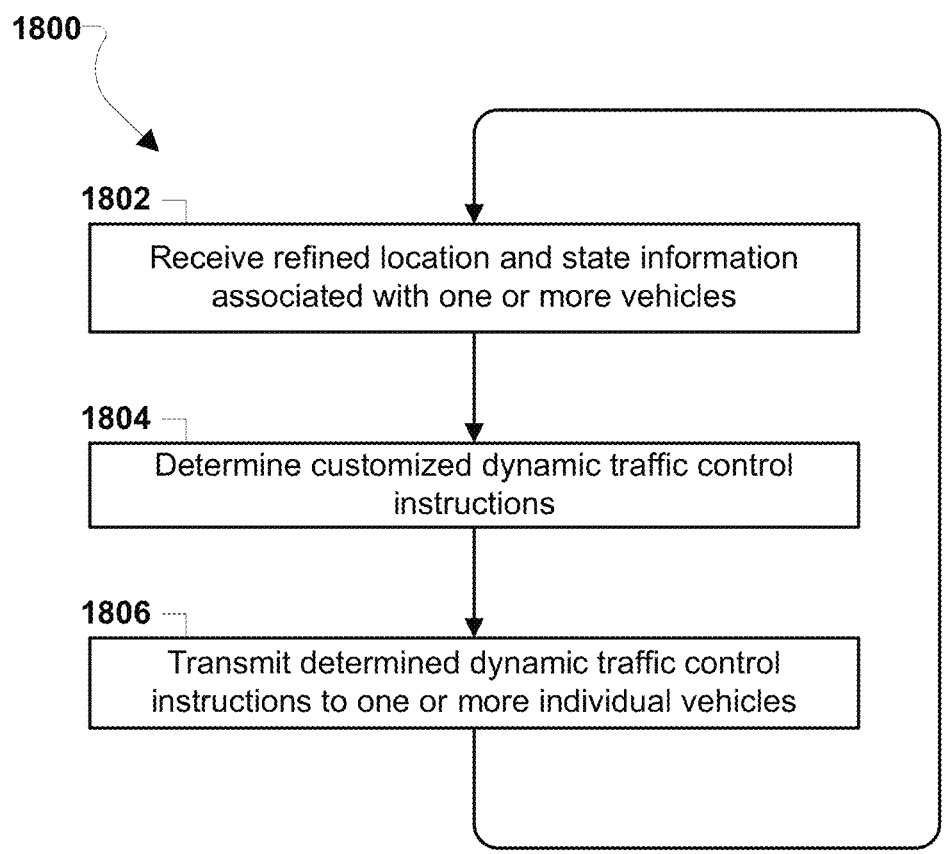
FIG. 18 is a process flow diagram of an example method of determining and transmitting customized dynamic traffic control instructions according to various embodiments.

FIG. 18 is a process flow diagram illustrating a method 1800 of providing interactive traffic controls that may be implemented in accordance with various embodiments. With reference to FIGS. 1-18, the method 1800 may be performed by a processor (e.g., 210, 214, 216, and 218) in an interactive traffic control device (e.g., 200).

In block 1802, the interactive traffic control device may receive refined location and state information associated with one or more individual vehicles on a roadway. The refined location and state information may be received from one or more vehicles. For example, an autonomous vehicle or a wireless communication device 190 in a non/semi-autonomous vehicle may transmit the refined location and state information to the interactive traffic control device. Alternatively, or additionally, the interactive traffic control devices may receive refined location and state information from various elements of the traffic management infrastructure (e.g., the adaptive traffic management server 110, roadway sensors 60, conventional traffic signaling devices 70, and other interactive traffic control devices 200). Also, the vehicles on the roadway may be various types of vehicles, including autonomous, semi-autonomous, or non-autonomous vehicles.

In block 1804, the interactive traffic control device may determine customized dynamic traffic control instructions based on the refined location and state information received in block 1802. In particular, the interactive traffic control device may determine first and second customized dynamic traffic control instructions. The first customized dynamic traffic control instructions may be determined for a first one or more of the individual vehicles and second customized dynamic traffic control instructions may be determined for a second one or more of the individual vehicles different from the first one or more of the individual vehicles. The first customized dynamic traffic control instructions may include navigational information that is different from navigational information included in the second customized dynamic traffic control instructions. For example, the first customized dynamic traffic control instructions may indicate a first navigational route on the roadway and the second customized dynamic traffic control instruction indicate a second navigational route on the roadway that differs from the first navigational route. In addition, one of the first or second customized dynamic traffic control instructions may include an optional alternative route not included in the other of the first or second customized dynamic traffic control instructions.

In block 1806, the interactive traffic control device may transmit the customized dynamic traffic control instructions to individual vehicles. Thus, the interactive traffic control device may transmit the first customized dynamic traffic control instructions to the first one or more of the individual vehicles and transmit the second customized dynamic traffic control instructions to the second one or more of the individual vehicles. The first and second customized dynamic traffic control instructions may be transmitted contemporaneously to the first and second one or more of the individual vehicles.

The transmission of the customized dynamic traffic control instructions by the interactive traffic control device may include generating a visual display on the interactive traffic control device configured to be visible to occupants of the first one or more of the individual vehicles. The interactive traffic control device may transmit the customized dynamic traffic control instructions using a wireless communication link between the interactive traffic control device and an onboard computing device of at least one of the first one or more of the individual vehicles. The interactive traffic control device may receive an acknowledgment of receipt from at least one of the first one or more of the individual vehicles. Alternatively or additionally, the interactive traffic control device may receive from at least one vehicle an indication that the vehicle(s) will follow the transmitted first customized dynamic traffic control instructions.

In various embodiments, after or while transmitting the customized dynamic traffic control instructions, the interactive traffic control device may continue or once again receive refined location and state information in block 1802.

Figure 19:
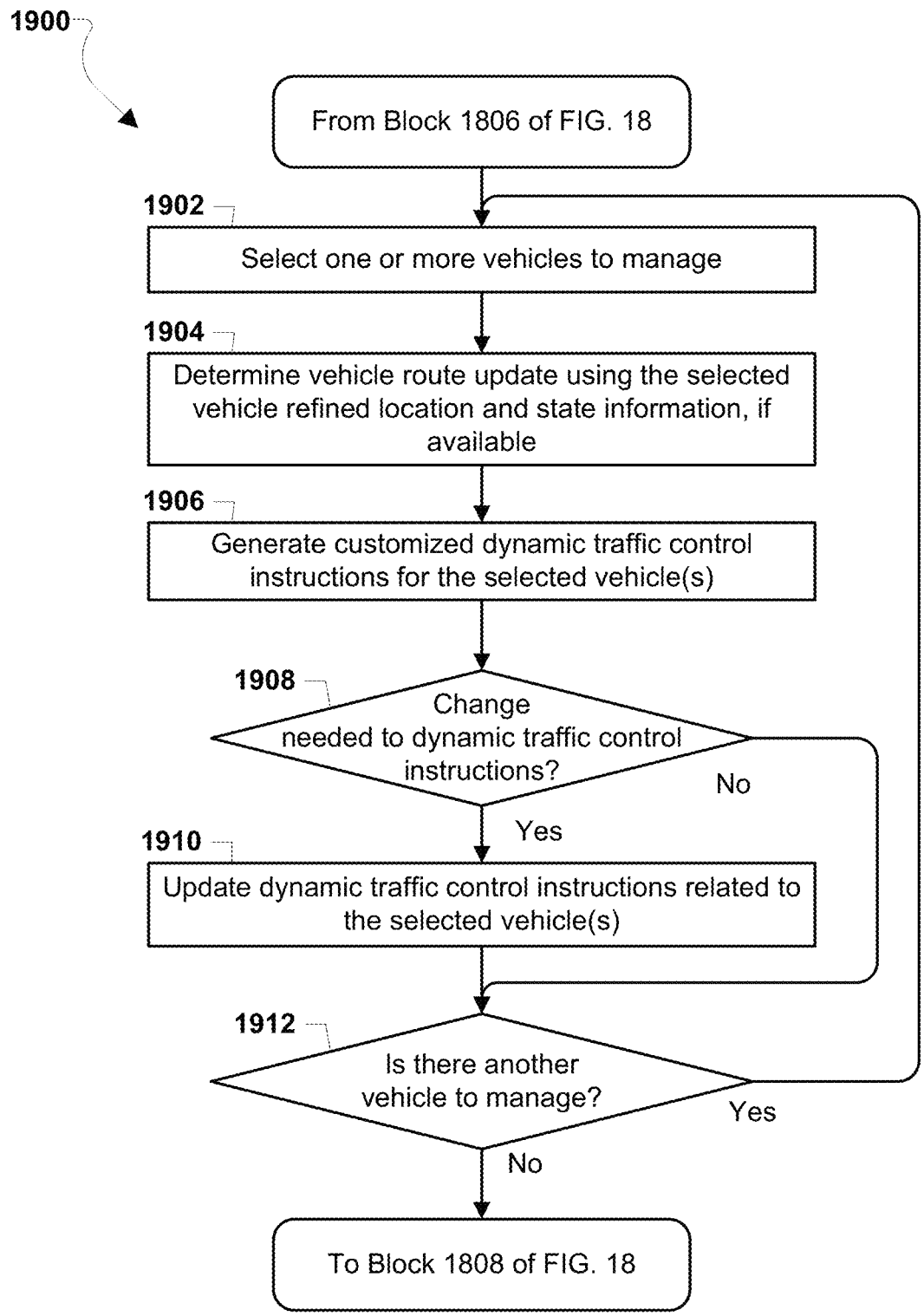
FIG. 19 is a process flow diagram of an example method of determining and transmitting an update to dynamic traffic control instructions according to various embodiments.

FIG. 19 is a process flow diagram illustrating a method 1900 of providing interactive traffic controls that may be implemented in accordance with various embodiments. With reference to FIGS. 1-19, the method 1900 may be performed by a processor (e.g., 210, 214, 216, and 218) in an interactive traffic control device (e.g., 200). The method 1900 provides an example of a vehicle-specific determination that may be made in block 1806 of the method 1800. The interactive traffic control device may make determinations about numerous specific vehicles, which may be done in parallel, in series, or a combination thereof In block 1902, the interactive traffic control device may identify or select a first one or more vehicles to manage. Vehicles on roadways monitored by the interactive traffic control device may be observed and their behaviors analyzed for traffic management and planning. All vehicles on roadways managed by the interactive traffic control device may be separately selected for detailed traffic management analysis by the interactive traffic control device. Alternatively, a subset of vehicular traffic may be selected for detailed traffic management analysis by the interactive traffic control device. For example, vehicles for which refined location and state information is received may be selected for detailed analysis while other vehicles, while considered as part of the traffic analysis and management, may only be analyzed or treated in a generalized way.

In block 1904, the interactive traffic control device may determine a vehicle route update using the selected vehicle refined location and state information, if available. The interactive traffic control device may also utilize the HD map information and the refined location and state information specific to the selected vehicle in order to determine any updates to the vehicle route that may be needed or suggested for the selected vehicle.

In block 1906, the interactive traffic control device may generate the customized dynamic traffic control instructions related to the selected vehicle.

In determination block 1908, the interactive traffic control device may determine whether a change to the customized dynamic traffic control instructions is needed based on the determination in block 1908. In response to determining that a change to the dynamic traffic control instructions is needed (i.e., determination block 1908="Yes"), the interactive traffic control device may update the dynamic traffic control instructions related to the selected vehicle(s) in block 1910.

In response to determining that no change to dynamic traffic control instructions is needed (i.e., determination block 1908="No") or after updating the dynamic traffic control instructions in block 1910, the interactive traffic control device may determine whether another vehicle needs to be managed in determination block 1912.

In response to determining that another vehicle needs to be managed (i.e., determination block 1912="Yes"), the interactive traffic control device may again identify or select one or more vehicles to manage in block 1902. In response to determining that no other vehicle needs to be managed (i.e., determination block 1912="No"), the interactive traffic control device may transmit update(s) of customized dynamic traffic control instructions in block 1808 of the method 1800 as described.

Figure 20:
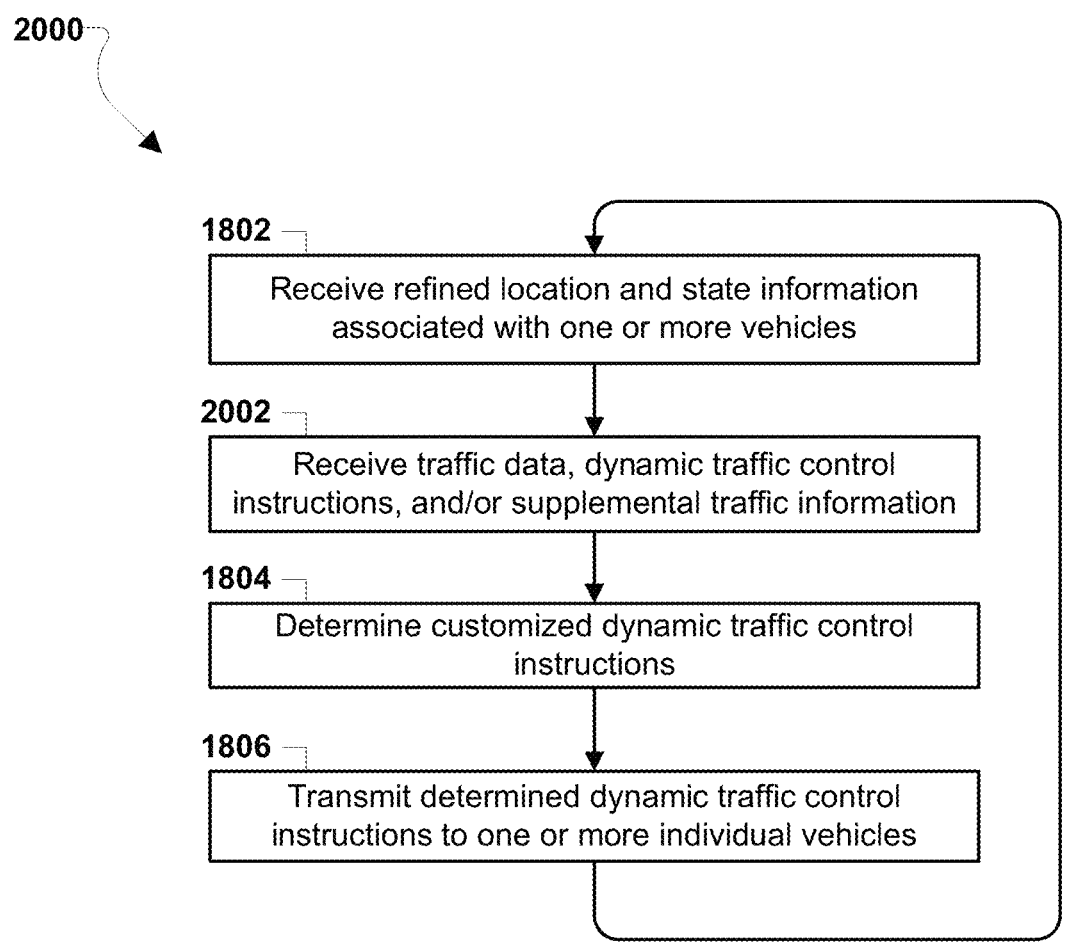
FIG. 20 is a process flow diagram of an example method of determining and transmitting customized dynamic traffic control instructions according to various embodiments.

FIG. 20 is a process flow diagram illustrating a method 2000 of providing interactive traffic controls that may be implemented in accordance with various embodiments. With reference to FIGS. 1-20, the method 2000 may be performed by a processor (e.g., 210, 214, 216, and 218) in an interactive traffic control device (e.g., 200). In the method 2000, the processor may provide interactive traffic controls by performing operations of blocks 1802, 1804, and 1806 of the method 1800 as described above.

After receiving refined location and state information from one or more vehicles in block 1802, the interactive traffic control device may receive traffic data, dynamic traffic control instructions, and/or supplemental traffic information in block 2002. For example, the roadway sensors, augmented conventional traffic signaling devices, the adaptive traffic management server, and/or other interactive traffic control devices acting as sensors or intermediaries may transmit traffic data to the receiving interactive traffic control device. The dynamic traffic control instructions may be received from an adaptive traffic management server and/or another interactive traffic control device (e.g., a neighboring interactive traffic control device). These dynamic traffic control instructions may include one or more dynamic traffic control inputs, which add to, subtract from, or change the rules used by the interactive traffic control device to generate customized dynamic traffic control instructions. The supplemental traffic information may include non-regulatory information or information not directly associated with vehicle navigation. For example, the supplemental traffic information may include alternate route options (e.g., scenic, no tolls, shorter, faster, etc.), advertisements, information about local attractions (e.g., fueling, dining, shopping, amusement, healthcare, government, religious establishments or scenic locations). The local attractions may be any place that draws visitors by providing something of interest. In addition, the supplemental traffic information may even include information about family, friends, and/or fellow travelers in other vehicles.

In block 1804, the interactive traffic control device may determine customized dynamic traffic control instructions based on refined location and state information received in block 1802 as well as traffic data, dynamic traffic control instructions, and/or supplemental traffic information received in block 2002.

In block 1806, the customized dynamic traffic control may transmit instructions to individual vehicles, and continue to receive refined location and state information in block 1802.

Figure 21A:
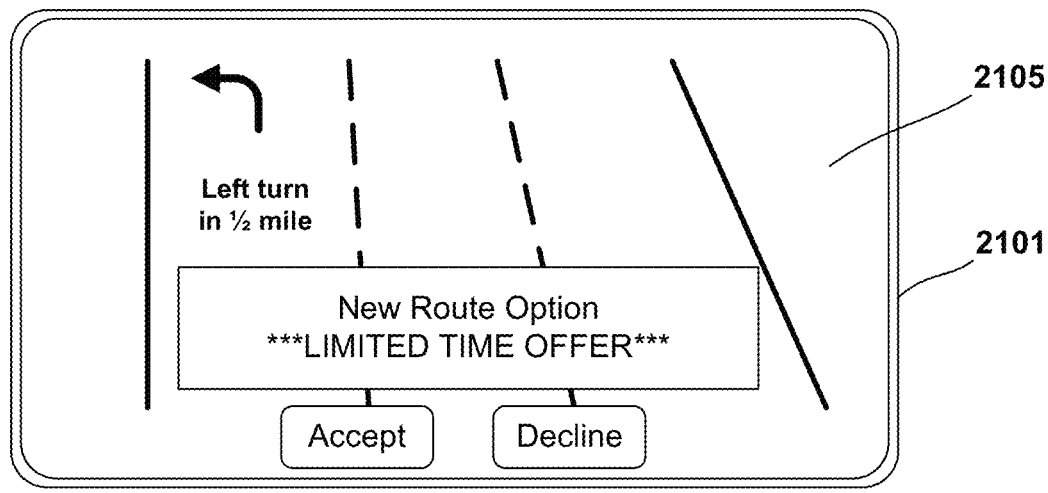
FIGS. 21A and 21B are graphical representations of displays on in-vehicle computing devices showing customized dynamic traffic control instructions in accordance with various embodiments.
Figure 21B:
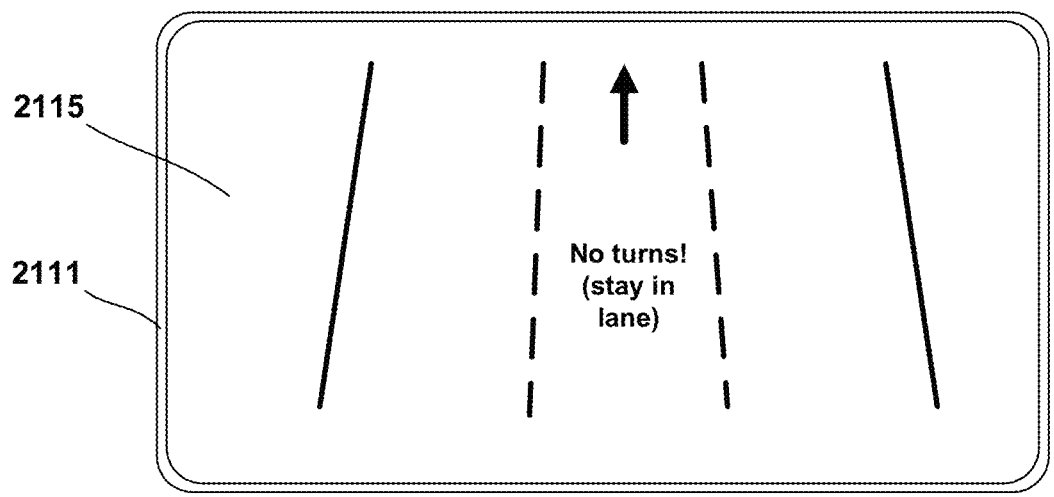

FIGS. 21A and 21B illustrate first and second vehicle displays 2101, 2111 showing first and second customized dynamic traffic control instructions 2105, 2115. A nearby interactive traffic control device (e.g., 200) may have determined and generated the first and second customized dynamic traffic control instructions 2105, 2115 based on refined location and state information received from the first and second vehicles. The first customized dynamic traffic control instructions 2105 shown in FIG. 21A may be transmitted to a set limited number of individual vehicles to routing of the vehicles along an optional alternative route that is not offered to other vehicles as illustrated in the second customized dynamic traffic control instructions 2115 shown in FIG. 21B.

The first and second vehicle displays 2101, 2111 may be rendered the graphical user interfaces of wireless communication devices (e.g., 190) located in different vehicles. The first customized dynamic traffic control instructions 2105 are illustrated in FIG. 21A as being displayed on the first vehicle display 2101, but may also be displayed in one or more other vehicles (i.e., a first set of vehicles), if the adaptive traffic management server 110 and/or a local interactive traffic control device 200 determines that more than one first vehicle should receive the first customized dynamic traffic control instructions 2105. Similarly, second customized dynamic traffic control instructions 2115 are illustrated in FIG. 21B as being displayed on the second vehicle display 2111, but may also be displayed in one or more other vehicles (i.e., a second set of vehicles), if the adaptive traffic management server 110 and/or a local interactive traffic control device 200 determines that more than one second vehicle should receive the second customized dynamic traffic control instructions 2115. An interactive traffic control device 200, which at least the first set of vehicles are approaching, may have transmitted the first and second customized dynamic traffic control instructions 2105, 2115.

In various embodiments, the first customized dynamic traffic control instructions 2105 illustrated in FIG. 21A may include conditional dynamic traffic control instruction that offers a route option to a determined limited number of vehicles. For example, the first customized dynamic traffic control instructions 2105 may present as an option to the vehicle, indicating, "Left turn in ½ mile." In addition, the first customized dynamic traffic control instructions 2105 may alert the viewer to additional information, such as that the displayed navigational instructions will "Save [the viewer] 3 minutes" and are part of a "NEW ROUTE TO YOUR DESTINATION." The first customized dynamic traffic control instructions 2105 are presented as an optional alternative route that a vehicle occupant may 'accept' or 'decline,' but which is not presented as part of the second customized dynamic traffic control instructions 2115 illustrated in FIG. 21B displayed in other vehicles. In contrast, the second vehicle display 2111 in such other vehicles may include the second customized dynamic traffic control instructions 2115 instructing indicating that the vehicle should make, "No turns!" and "stay in lane."

Such conditional dynamic traffic control instructions, while offered to a limited set of vehicles, may not by accepted by operators of every vehicle to which those instructions are transmitted. For example, some the operators of some vehicles may decline the offer. Vehicles in which the operator accepts the conditional dynamic traffic control instructions my transmit an acceptance of the offered optional route alternative to the interactive traffic control device.

In some embodiments, fewer than all the vehicles offered the conditional dynamic traffic control instruction may be allowed to accept the offer. For example, the displayed offer may state that only the first three (3) vehicles to accept the offer will be granted authorization to use the optional route alternative. In this way, only a subset of the determined limited number of vehicles offered the conditional dynamic traffic control instructions (i.e., fewer than all the vehicles presented with the offer) may be allowed to travel along the alternative route. This may be helpful for ensuring that alternative routes and detours do not become overcrowded or lead to traffic backups. The vehicles granted authorization to follow the optional route may be selected based on the order in which the vehicles respond to the conditional dynamic traffic control instruction display or whether the vehicles responded within a set expiration period (e.g., within 10 seconds of the offer being presented). Alternatively, there may be multiple criteria for selecting the vehicles to be granted authorization to use the conditional dynamic traffic control instructions. For example, the vehicles accepting the conditional offer may not only have to be the first vehicles to respond, but may also need to be in a particular location or region. Thus, the interactive traffic control device may transmit an offer termination message once the permitted number of vehicles have been granted access to the optional route so that the offer disappears from vehicle displays. Also, the interactive traffic control device may transmit a denial of an acceptance based on conditions determined in response to receiving the acceptance of the offered optional route alternative while the offer remains available to other qualifying vehicles. Also, along with the denial or in-place of the denial, the interactive traffic control device may transmit a different optional route alternative based on conditions determined in response to receiving the acceptance of the offered optional route alternative.

Figure 22:
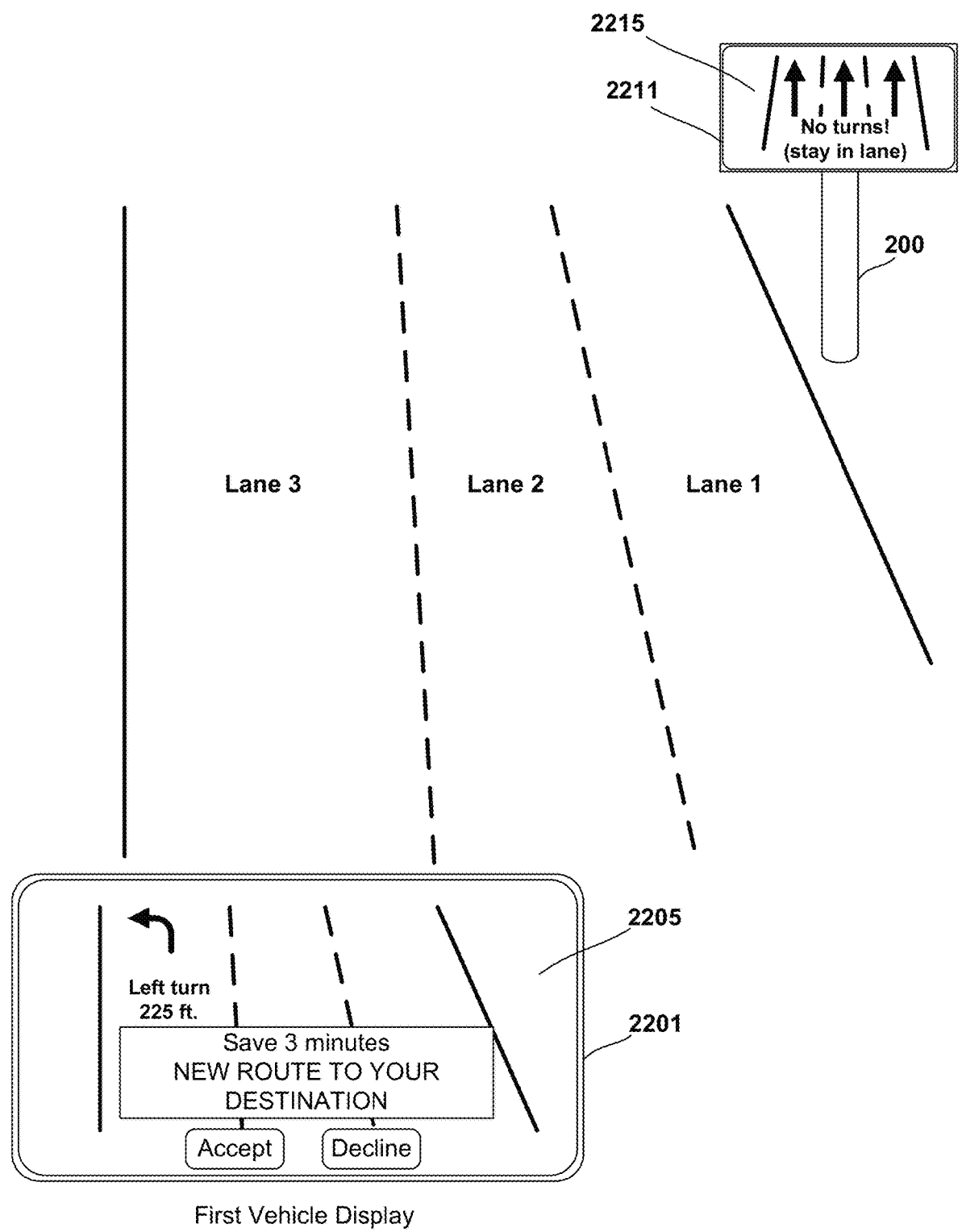
FIG. 22 is a graphical representation of a first display on an in-vehicle computing devices showing customized dynamic traffic control instructions and a second display on a roadside display of an interactive traffic control device in accordance with various embodiments.

FIG. 22 illustrates an in-vehicle display 2201 and a dynamic roadside display 2211 showing first and second customized dynamic traffic control instructions 2205, 2215, respectively. A nearby interactive traffic control device (e.g., 200) may have determined and generated the first and second customized dynamic traffic control instructions 2205, 2215 based on the received refined location and state information. The first customized dynamic traffic control instructions 2205 may have been transmitted to a set limited number of individual vehicles and may offer an optional route alternative not offered in the second customized dynamic traffic control instructions 2215. The nearby interactive traffic control device 200 may also transmits the second customized dynamic traffic control instructions 2215 through an active display screen. Thus, in the example illustrated in FIG. 22, the transmission of the second customized dynamic traffic control instructions 2215 uses a visual display of the interactive traffic control device 200 that is configured to be viewable by vehicle occupants.

Figure 23:
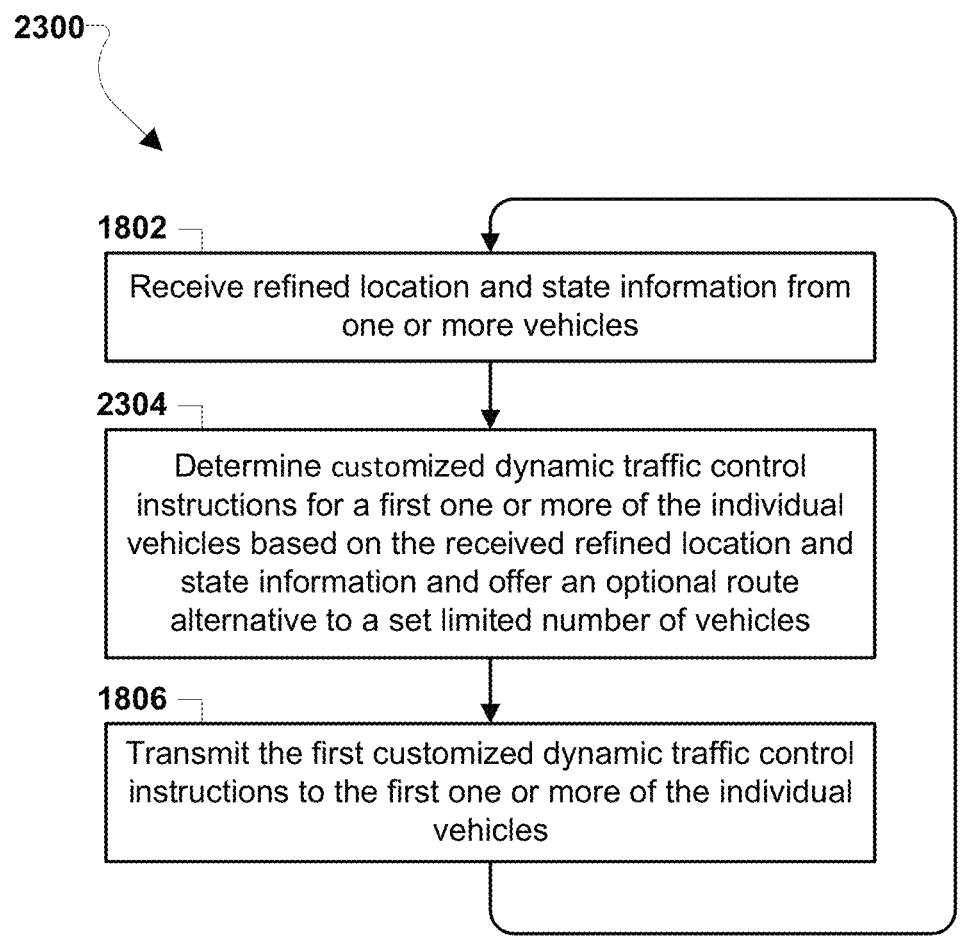
FIG. 23 is a process flow diagram of an example method of determining and transmitting customized dynamic traffic control instructions including an optional route alternative according to some embodiments.

FIG. 23 is a process flow diagram illustrating a method 2300 of providing interactive traffic controls that may be implemented in accordance with various embodiments. With reference to FIGS. 1-23, the method 2300 may be performed by a processor (e.g., 210, 214, 216, and 218) in an interactive traffic control device (e.g., 200). In the method 2300, the processor may provide interactive traffic controls by performing operations of blocks 1802 and 1806 of the methods 1800 and 2000 as described above.

In block 2304, the interactive traffic control device may determine first customized dynamic traffic control instructions based on refined vehicle location and state information received in block 1802. In addition, the determined first customized dynamic traffic control instructions may offer an optional route alternative to a set limited number of the individual vehicles.

After or while transmitting the customized dynamic traffic control instructions in block 1806, the interactive traffic control device may continue or once again receive refined location and state information in block 1802.

Figure 24A:
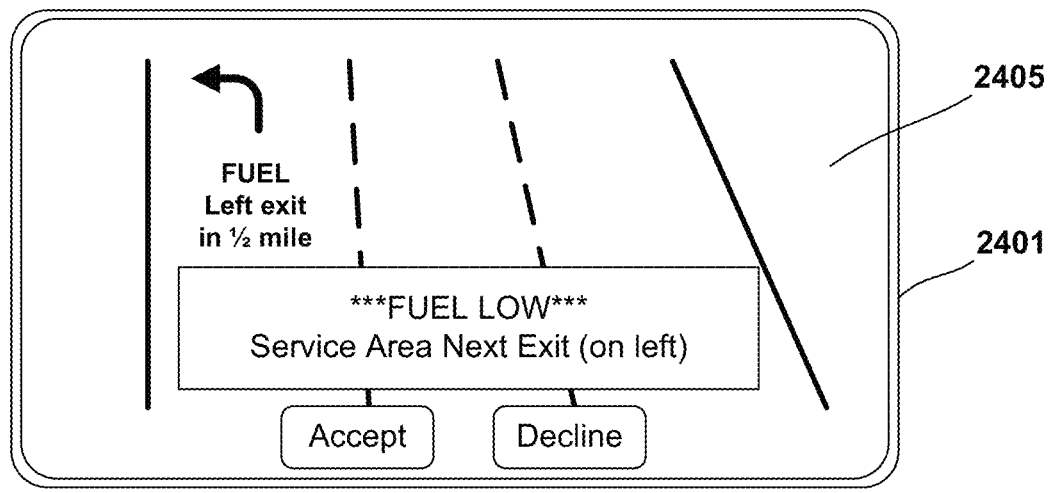
FIG. 24A and 24B are graphical representations of displays on in-vehicle computing devices showing customized dynamic traffic control instructions in accordance with some embodiments.
Figure 24B:
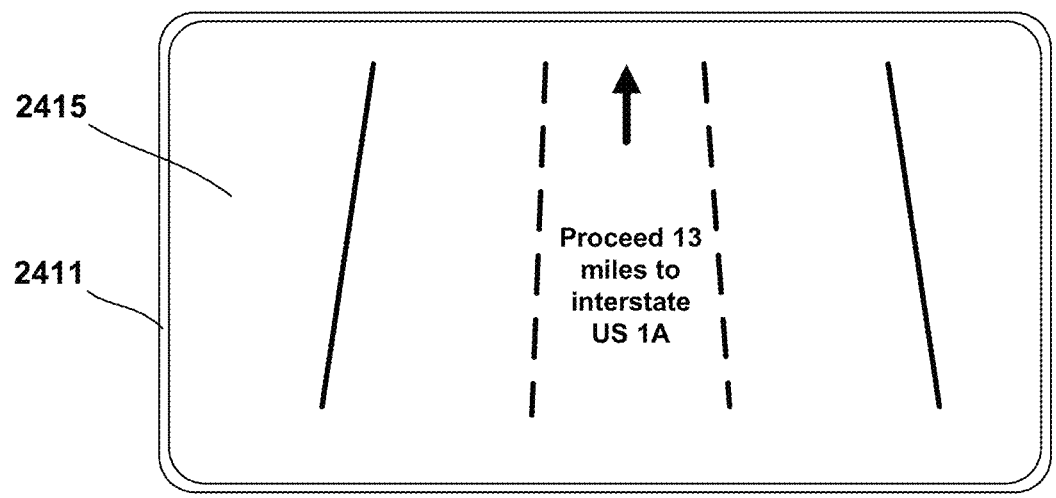

FIGS. 24A and 24B illustrate first and second vehicle displays 2401, 2411 showing first and second customized dynamic traffic control instructions 2405, 2415, respectively. A nearby interactive traffic control device (e.g., 200) may have determined and generated the first and second customized dynamic traffic control instructions 2405, 2415 based on refined location and state information received from vehicles, after ensuring that the determined customized dynamic traffic control instructions do not conflict with notable elements identified (i.e., determined) from the refined location and state information.

Notable elements that may be commonly determined from the refined vehicle location and state information may include a vehicle's current location, direction of travel, and/or destination. Such elements may be considered notable since any traffic control instructions prepared for that vehicle should preferably take such information into account. For example, various embodiments may try to avoid presenting traffic control instructions that have no relation to a vehicle's current location, direction of travel, or destination. In addition, the refined location and state information may indicate vehicle/user preferences or other settings like whether the user is actively seeking a route alternative or a local attraction. Vehicle/user preferences may include elements such as whether the user does not want to be presented with advertisements (i.e., "do not disturb") or whether the user has route preferences, such as scenic/non-scenic routes, no tolls, shorter, faster, etc. Such preferences may be considered notable elements that may conflict with certain dynamic traffic control instructions. For example, if the user preferences indicate the user does not want to see advertisements, then the customized dynamic traffic control instructions should not present the user with advertisements. Similarly, if the user preferences indicate the user prefers not to travel on toll roads then the customized dynamic traffic control instructions should not direct the subject vehicle to use a toll road. Additionally, the user preferences may indicate that the occupants of the subject vehicle want to remain within a quarter mile of another vehicle (e.g., a car of a family member, friend, and/or fellow travelers). In this way, the customized dynamic traffic control instructions may be generated to keep the two vehicles close in order to avoid a conflict.

Occasionally, rather than driving straight to one's destination, vehicle occupants may want to stop for various reasons (i.e., actively seeking to stop or detour). For example, the occupants may be interested in stopping at a local attraction for fuel, to eat, shop, amusement, healthcare, government or religious services or some scenic locations. Thus, the refined location and stare information may indicate such preferences. In this way, the customized dynamic traffic control instructions may be generated to direct the subject vehicle towards a closest stop or detour that is an appropriate match and, perhaps, does not require a significant deviation from a current route to its original destination.

With reference again to FIGS. 24A and 24B, consider a scenario in which two vehicles (e.g., a first vehicle with the first vehicle display 2401 shown in FIG. 24A and a second vehicle with the second vehicle display 2411 shown in FIG. 24B) are headed to the same destination and are driving in close proximity to one another. In this scenario, occupants of the first vehicle have entered a user preference that indicates they wish to stop for gas as soon as possible. In contrast, the second vehicle may not need gas and neither vehicle has entered a preference to remain in close proximity to one another. In accordance with various embodiments, the interactive traffic control device may have received the first vehicle's refined location and state information, which indicates a desire to stop for gas. Also, the interactive traffic control device may have received the second vehicle's refined location and state information, which indicates no desire to stop. The desire to stop for gas and the desire not to stop may be considered notable elements in the refined location and state information. Additionally, based on the refined location and state information, the interactive traffic control device may determine first and second customized dynamic traffic control instructions, respectively for the first and second vehicles, based on the refined location and state information. Before transmitting any dynamic traffic control instructions, the interactive traffic control device may ensure that the customized dynamic traffic control instructions do not conflict with the identified notable elements from the refined location and state information. Thus, the interactive traffic control device transmits very different customized dynamic traffic control instructions 2405, 2415 to each vehicle, with the first customized dynamic traffic control instructions 2405 suggesting that the first vehicle exit in one-half mile for gas while the second customized dynamic traffic control instructions 2415 instruct the second vehicle to continue along its route to its destination (i.e., "proceed for another 13 miles").

Figure 25:
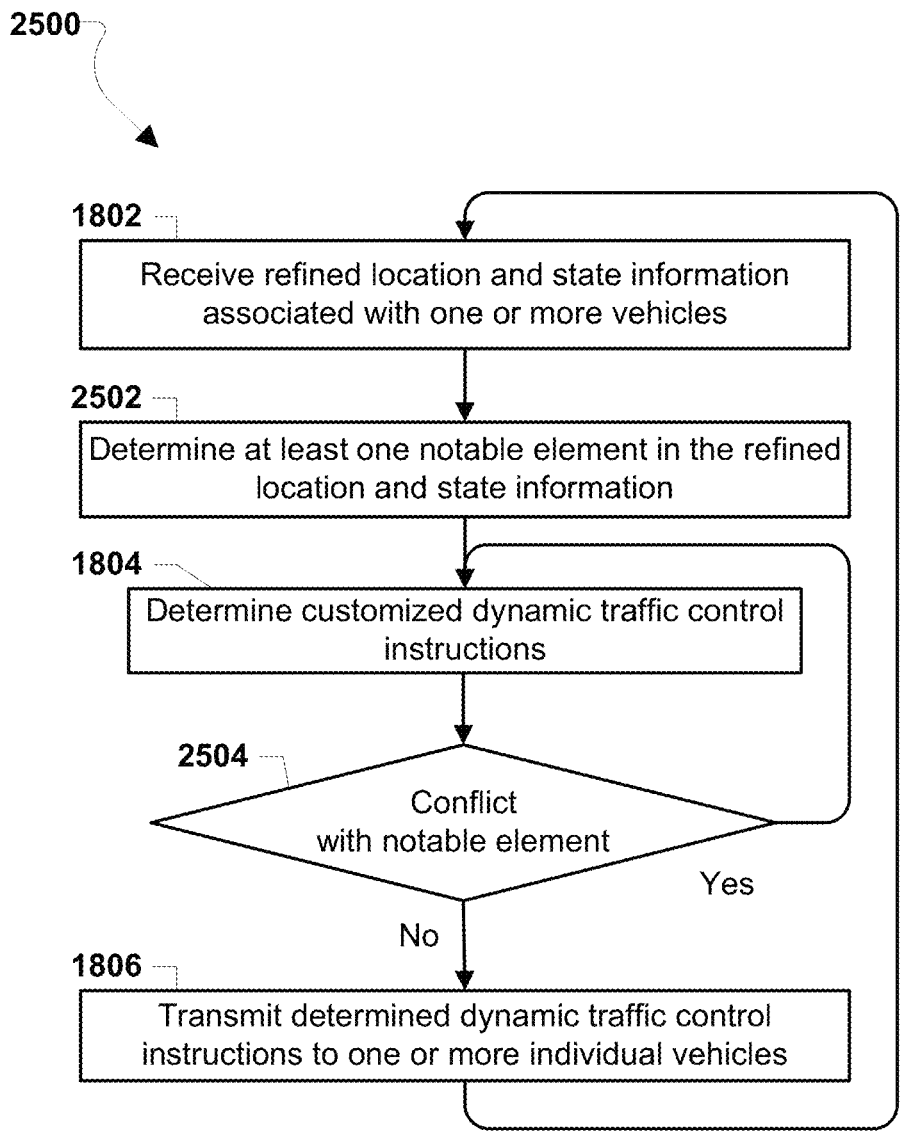
FIG. 25 is a process flow diagram of an example method of determining and transmitting customized dynamic traffic control instructions for a set limited number of vehicles according to various embodiments.

FIG. 25 is a process flow diagram illustrating a method 2500 of providing interactive traffic controls that may be implemented in accordance with various embodiments. With reference to FIGS. 1-25, the method 2500 may be performed by a processor (e.g., 210, 214, 216, and 218) in an interactive traffic control device (e.g., 200). In the method 2500, the processor may provide interactive traffic controls by performing operations of blocks 1802, 1804, and 1806 of the methods 1800 and 2000 as described.

After receiving refined location and state information from one or more vehicles in block 1802, the interactive traffic control device may determine at least one notable element in the refined location and state information in block 2502. For example, the at least one notable element may include a current route of the first vehicle derived from the received refined location and state information.

In block 1804, the interactive traffic control device may determine customized dynamic traffic control instructions based on the refined location and state information received in block 1802, as well as additional information such as traffic data, dynamic traffic control instructions, and/or supplemental traffic information.

In determination block 2504, the processor may determine whether the customized dynamic traffic control instructions conflict with the determined at least one notable element determined in block 2502.

In response to determining that the customized dynamic traffic control instructions conflict with the determined at least one notable element (i.e., determination block 2504="Yes"), the interactive traffic control device may determine alternative customized dynamic traffic control instructions in block 1804.

In response to determining that the customized dynamic traffic control instructions do not conflict with the determined at least one notable element (i.e., determination block 2504="No"), the interactive traffic control device may transmit the customized dynamic traffic control instructions to the vehicle in block 1806.

In various embodiments, after or while transmitting the customized dynamic traffic control instructions in block 1806, the interactive traffic control device may continue or once again receive refined location and state information from the vehicle in block 1802.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of providing interactive traffic controls to vehicles, comprising:
   receiving, by an interactive traffic control device located alongside or near a roadway, refined location and state information associated with individual vehicles on a roadway;
   determining, by the interactive traffic control device, first customized dynamic traffic control instructions for a first one or more of the individual vehicles, wherein the first customized dynamic traffic control instructions are based on the received refined location and state information and offer an optional route alternative to a set limited number of the individual vehicles, wherein a subset of the set limited number of the individual vehicles are granted authorization to use the optional route alternative based on an order in which the subset of the set limited number of the individual vehicles respond to the first customized dynamic traffic control instructions; and
   transmitting the first customized dynamic traffic control instructions, by the interactive traffic control device, to the first one or more of the individual vehicles.

2. The method of claim 1, wherein the first customized dynamic traffic control instructions include a set expiration period, wherein vehicles that accept the optional route alternative within the set expiration period are authorized to use the optional route alternative.

3. The method of claim 1, wherein a subset of the set limited number of the individual vehicles are granted authorization to use the optional route alternative based on each of the vehicles that respond to the first customized dynamic traffic control instruction meeting multiple criteria.

4. The method of claim 1, further comprising:
receiving, by the interactive traffic control device, an acceptance of the optional route alternative.

5. The method of claim 4, further comprising:
determining whether a vehicle transmitting the acceptance of the optional route alternative should be authorized to follow the optional route alternative based on conditions determined in response to receiving the acceptance of the optional route alternative; and
transmitting, by the interactive traffic control device, a denial of the acceptance in response to determining that the vehicle transmitting the acceptance of the offered optional route alternative should not be authorized to follow the optional route alternative.

6. The method of claim 5, further comprising:
transmitting, by the interactive traffic control device, a different route alternative in response to determining that the vehicle transmitting the acceptance of the offered optional route alternative should not be authorized to follow the optional route alternative.

7. The method of claim 1, further comprising:
determining, by the interactive traffic control device, second customized dynamic traffic control instructions for a second one or more of the individual vehicles different from the first one or more of the individual vehicles, wherein the first customized dynamic traffic control instructions include navigational information different from navigation information included in the second customized dynamic traffic control instructions; and
transmitting the second customized dynamic traffic control instructions, by the interactive traffic control device, to the second one or more of the individual vehicles.

8. The method of claim 7, wherein the optional route alternative is not included in the second customized dynamic traffic control instructions.

9. The method of claim 1, wherein transmitting the first customized dynamic traffic control instructions uses a wireless communication link between the interactive traffic control device and a mobile communication device within at least one of the first one or more of the individual vehicles.

10. The method of claim 1, wherein transmitting the first customized dynamic traffic control instructions uses a wireless communication link between the interactive traffic control device and an onboard computing device of at least one of the first one or more of the individual vehicles.

11. The method of claim 1, wherein at least one of the first one or more of the individual vehicles is an autonomous vehicle.

12. An interactive traffic control device, comprising:
a transceiver; and
a processor coupled to the transceiver and configured with processor-executable instructions to:
receive refined location and state information associated with individual vehicles on a roadway;
determine first customized dynamic traffic control instructions for a first one or more of the individual vehicles, wherein the first customized dynamic traffic control instructions are based on the received refined location and state information and offer an optional route alternative to a set limited number of the individual vehicles, wherein a subset of the set limited number of the individual vehicles are granted authorization to use the optional route alternative based on an order in which the subset of the set limited number of the individual vehicles respond to the first customized dynamic traffic control instructions; and
transmit the first customized dynamic traffic control instructions to the first one or more of the individual vehicles.

13. The interactive traffic control device of claim 12, wherein the processor is further configured with processor-executable instructions to include a set expiration period within the first customized dynamic traffic control instructions, wherein vehicles that accept the optional route alternative within the set expiration period are authorized to use the optional route alternative.

14. The interactive traffic control device of claim 12, wherein the processor is further configured with processor-executable instructions to grant authorization to use the optional route alternative to a subset of the set limited number of the individual vehicles based on each of the vehicles that respond to the first customized dynamic traffic control instruction meeting multiple criteria.

15. The interactive traffic control device of claim 12, wherein the processor is further configured with processor-executable instructions to:
receive an acceptance of the optional route alternative.

16. The interactive traffic control device of claim 15, wherein the processor is further configured with processor-executable instructions to:
determine whether a vehicle transmitting the acceptance of the optional route alternative should be authorized to follow the optional route alternative based on conditions determined in response to receiving the acceptance of the optional route alternative; and
transmit a denial of the acceptance in response to determining that the vehicle transmitting the acceptance of the offered optional route alternative should not be authorized to follow the optional route alternative.

17. The interactive traffic control device of claim 16, wherein the processor is further configured with processor-executable instructions to:
transmit a different route alternative in response to determining that the vehicle transmitting the acceptance of the offered optional route alternative should not be authorized to follow the optional route alternative.

18. The interactive traffic control device of claim 12, wherein the processor is further configured with processor-executable instructions to:
determine second customized dynamic traffic control instructions for a second one or more of the individual vehicles different from the first one or more of the individual vehicles, wherein the first customized dynamic traffic control instructions include navigational information different from navigation information included in the second customized dynamic traffic control instructions; and
transmit the second customized dynamic traffic control instructions to the second one or more of the individual vehicles.

19. The interactive traffic control device of claim 18, wherein the processor is further configured with processor-executable instructions to not include the optional route alternative in the second customized dynamic traffic control instructions.

20. The interactive traffic control device of claim 12, wherein the processor is further configured with processor-executable instructions to transmit the first customized dynamic traffic control instructions using a wireless communication link between the interactive traffic control device and a mobile communication device within at least one of the first one or more of the individual vehicles.

21. The interactive traffic control device of claim 12, wherein the processor is further configured with processor-executable instructions to transmit the first customized dynamic traffic control instructions using a wireless communication link between the interactive traffic control device and an onboard computing device of at least one of the first one or more of the individual vehicles.

22. The interactive traffic control device of claim 12, wherein the processor is further configured with processor-executable instructions to transmit the first customized dynamic traffic control instructions to an autonomous vehicle.

23. A non-transitory processor-readable storage medium having stored thereon processor-executable instructions configured to cause a processor of an interactive traffic control device to perform operations comprising:
  receiving refined location and state information associated with individual vehicles on a roadway;
  determining first customized dynamic traffic control instructions for a first one or more of the individual vehicles, wherein the first customized dynamic traffic control instructions are based on the received refined location and state information and offer an optional route alternative to a set limited number of the individual vehicles, wherein a subset of the set limited number of the individual vehicles are granted authorization to use the optional route alternative based on an order in which the subset of the set limited number of the individual vehicles respond to the first customized dynamic traffic control instructions; and
  transmitting the first customized dynamic traffic control instructions to the first one or more of the individual vehicles.

24. The non-transitory processor-readable storage medium of claim 23, wherein the stored processor-executable instructions are configured to cause the processor of the interactive traffic control device to perform operations such that a subset of the set limited number of the individual vehicles are granted authorization to use the optional route alternative based on each of the vehicles that respond to the first customized dynamic traffic control instruction meeting multiple criteria.

25. The non-transitory processor-readable storage medium of claim 23, wherein the stored processor-executable instructions are configured to cause the processor of the interactive traffic control device to perform operations such that:
  the first customized dynamic traffic control instructions include a set expiration period, wherein vehicles that accept the optional route alternative within the set expiration period are authorized to use the optional route alternative.

26. The non-transitory processor-readable storage medium of claim 23, wherein the stored processor-executable instructions are configured to cause the processor of the interactive traffic control device to perform operations further comprising:
  receiving an acceptance of the optional route alternative;
  determining whether a vehicle transmitting the acceptance of the optional route alternative should be authorized to follow the optional route alternative based on conditions determined in response to receiving the acceptance of the optional route alternative; and
  transmitting a denial of the acceptance in response to determining that the vehicle transmitting the acceptance of the offered optional route alternative should not be authorized to follow the optional route alternative.

27. The non-transitory processor-readable storage medium of claim 23, wherein the stored processor-executable instructions are configured to cause the processor of the interactive traffic control device to perform operations further comprising:
  determining second customized dynamic traffic control instructions for a second one or more of the individual vehicles different from the first one or more of the individual vehicles, wherein the first customized dynamic traffic control instructions include navigational information different from navigation information included in the second customized dynamic traffic control instructions; and
  transmitting the second customized dynamic traffic control instructions to the second one or more of the individual vehicles.

28. An interactive traffic control device, comprising:
  means for receiving refined location and state information associated with individual vehicles on a roadway;
  means for determining first customized dynamic traffic control instructions for a first one or more of the individual vehicles, wherein the first customized dynamic traffic control instructions are based on the received refined location and state information and offer an optional route alternative to a set limited number of the individual vehicles, wherein a subset of the set limited number of the individual vehicles are granted authorization to use the optional route alternative based on an order in which the subset of the set limited number of the individual vehicles respond to the first customized dynamic traffic control instructions; and
  means for transmitting the first customized dynamic traffic control instructions to the first one or more of the individual vehicles.

* * * * *